(12) United States Patent
Wang

(10) Patent No.: US 10,237,038 B2
(45) Date of Patent: Mar. 19, 2019

(54) INFORMATION TRANSMISSION METHOD, DEVICE, AND SYSTEM

(71) Applicant: Huawei Technologies Co., Ltd., Shenzhen, Guangdong (CN)

(72) Inventor: Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/544,861

(22) PCT Filed: Jan. 20, 2015

(86) PCT No.: PCT/CN2015/071120
§ 371 (c)(1),
(2) Date: Jul. 19, 2017

(87) PCT Pub. No.: WO2016/115681
PCT Pub. Date: Jul. 28, 2016

(65) Prior Publication Data
US 2018/0013531 A1 Jan. 11, 2018

(51) Int. Cl.
*H04L 27/26* (2006.01)
*H04L 5/00* (2006.01)
(Continued)

(52) U.S. Cl.
CPC .............. *H04L 5/0051* (2013.01); *H04L 1/00* (2013.01); *H04L 5/0053* (2013.01);
(Continued)

(58) Field of Classification Search
CPC ..... H04L 5/0051; H04L 27/0006; H04L 1/00; H04L 5/0053; H04L 27/26; H04W 16/14
See application file for complete search history.

(56) References Cited

U.S. PATENT DOCUMENTS 9,258,807 B2 * 2/2016 Choi ............... H04L 5/0007
9,820,237 B2 * 11/2017 Yang ............... H04W 52/146
(Continued)

FOREIGN PATENT DOCUMENTS

CN 102136251 A 9/2011
CN 102938690 A 2/2013
(Continued)

OTHER PUBLICATIONS

Alcatel-Lucent et al., "LBT Enhancements for Licensed-Assisted Access", 3GPP TSG RAN WG1 Meeting #79, San Francisco, USA, Nov. 17-21, 2014, 6 pages, XP050875784, R1-144701.
(Continued)

*Primary Examiner* — Phuc H Tran

(57) ABSTRACT

The present invention discloses an information transmission method, a device, and a system, which relates to the communications field, so as to resolve a prior-art problem that a receive end cannot determine a quantity of OFDMs included in an incomplete subframe, and cannot correctly receive the incomplete subframe. A specific solution is as follows: A network device determines one or more PHICH resources of a first subframe, where the one or more physical hybrid automatic repeat request indicator channel PHICH resources indicate a quantity of orthogonal frequency division multiplexing OFDM symbols included in a second subframe on an unlicensed carrier; and the network device sends the first subframe and the second subframe to user equipment. The present invention is used for information transmission.

16 Claims, 4 Drawing Sheets

(51) Int. Cl.
  *H04W 16/14* (2009.01)
  *H04L 1/00* (2006.01)
  *H04L 27/00* (2006.01)
(52) U.S. Cl.
  CPC .......... *H04L 27/0006* (2013.01); *H04L 27/26* (2013.01); *H04W 16/14* (2013.01)

(56) References Cited

U.S. PATENT DOCUMENTS

| | | | |
|---|---|---|---|
| 2011/0243261 A1* | 10/2011 | Bienas | H04W 72/1215 375/260 |
| 2014/0044105 A1 | 2/2014 | Bontu et al. | |
| 2014/0153528 A1 | 6/2014 | Chen et al. | |
| 2014/0204854 A1* | 7/2014 | Freda | H04L 1/18 370/329 |
| 2015/0131536 A1 | 5/2015 | Kaur et al. | |
| 2017/0127414 A1* | 5/2017 | Yi | H04L 27/2611 |
| 2017/0180086 A1* | 6/2017 | Xiong | H04L 1/1854 |

FOREIGN PATENT DOCUMENTS

| | | |
|---|---|---|
| CN | 103370896 A | 10/2013 |
| WO | 2012039656 A1 | 3/2012 |

OTHER PUBLICATIONS

3rd Generation Partnership Project; Technical Specification Group Radio Access Network; Evolved Universal Terrestrial Radio Access (E-UTRA); Physical layer procedures (Release 12), 3GPP TS 36.213 V12.3.0 (Sep. 2014), 212 pages, XP050926112.

3rd Generation Partnership Project; Technical Specification Group Radio Access Network; Evolved Universal Terrestrial Radio Access (E-UTRA); Physical channels and modulation (Release 12), 3GPP TS 36.211 V12.3.0 (Sep. 2014), 124 pages, XP050925832.

* cited by examiner

INFORMATION TRANSMISSION METHOD, DEVICE, AND SYSTEM

CROSS-REFERENCE TO RELATED APPLICATIONS

This application is a National Stage of International Application No. PCT/CN2015/071120, filed on Jan. 20, 2015, which is hereby incorporated by reference in its entirety.

TECHNICAL FIELD

The present invention relates to the communications field, and in particular, to an information transmission method, a device, and a system.

BACKGROUND

In a wireless communications network, each device needs to transmit information by using a frequency resource. The frequency resource is also referred to as a spectrum. Spectra may be divided into a licensed spectrum and an unlicensed spectrum. The licensed spectrum is a dedicated frequency resource, and the unlicensed spectrum is a public frequency resource.

As communications technologies develop, increasing information is transmitted in the wireless communications network.

An unlicensed spectrum may be preempted to transmit information, so as to increase a data throughput in the wireless communications network and better satisfy a user requirement.

However, in the prior art, when a device successfully preempts a channel of an unlicensed spectrum, data may be sent at a random time, and consequently, a first subframe that is sent by the device may be an incomplete subframe. Referring to FIG. 1, in this case, a receive end cannot determine a quantity of OFDM (Orthogonal Frequency Division Multiplexing, orthogonal frequency division multiplexing) symbols included in an incomplete first subframe, and cannot correctly receive the incomplete subframe.

SUMMARY

Embodiments of the present invention provide an information transmission method, a device, and a system, so as to resolve a prior-art problem that a receive end cannot determine a quantity of OFDM symbols included in an incomplete subframe, and cannot correctly receive the incomplete subframe.

To achieve the foregoing objective, the following technical solutions are used in the embodiments of the present invention.

According to a first aspect, an information transmission method is provided, including:

determining, by a network device, one or more physical hybrid automatic repeat request indicator channel PHICH resources of a first subframe, where the one or more physical hybrid automatic repeat request indicator channel PHICH resources indicate a quantity of orthogonal frequency division multiplexing OFDM symbols included in a second subframe on an unlicensed carrier; and sending, by the network device, the first subframe and the second subframe to user equipment, where the second subframe is sent before the first subframe, the first subframe includes M orthogonal frequency division multiplexing OFDM symbols, the second subframe includes N OFDM symbols, M and N are positive integers, and M≥N.

With reference to the first aspect, in a first possible implementation of the first aspect, the determining, by a network device, the one or more PHICH resources includes:

determining, by the network device, a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$.

With reference to the first possible implementation of the first aspect, in a second possible implementation of the first aspect, the method further includes:

sending, by the network device, the number $n\_u_{PHICH}^{group}$ of the PHICH group of the one or more PHICH resources, and the number $n\_u_{PHICH}^{seq}$ of the orthogonal sequence in the PHICH group $n\_u_{PHICH}^{group}$ to the user equipment.

With reference to the first aspect, in a third possible implementation of the first aspect, the determining, by a network device, the one or more PHICH resources includes:

determining, by the network device, a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to a cell identity.

With reference to the first aspect, in a fourth possible implementation of the first aspect, the determining, by a network device, the one or more PHICH resources includes:

determining, by the network device, a number $n\_u_{PHICH}^{group}$ of a PHICH group of the one or more PHICH resources according to a formula $n\_u_{PHICH}^{group}=\mod(\text{Cell\_ID}, N_{PHICH}^{group})$, $n\_u_{PHICH}^{group}=\mod(F(\text{Cell\_ID}), N_{PHICH}^{group})$, or $n\_u_{PHICH}^{group}=\mod(F(\text{Cell\_ID},\text{Opera\-tor\_ID}), N_{PHICH}^{group})$; and determining, by the network device, a number $n\_u_{PHICH}^{seq}$ of an orthogonal sequence in the PHICH group $n\_u_{PHICH}^{group}$ of the one or more PHICH resources according to a formula $n\_u_{PHICH}^{group}=\mod(\text{Cell\_ID}, N_{PHICH}^{seq})$, $n\_u_{PHICH}^{seq}=\mod(F(\text{Cell\_ID}), N_{PHICH}^{seq})$, or $n\_u_{PHICH}^{seq}=\mod(F(\text{Cell\_ID},\text{Operator\_ID}), N_{PHICH}^{seq})$, where mod( ) is a mod function, Cell_ID is a cell identity, F(Cell_ID) is a function in which the cell identity is an independent variable, Operator_ID is an operator identifier, F(Cell_ID,Operator_ID) is a function in which the cell identity and the operator identifier are independent variables, $N_{PHICH}^{group}$ is a quantity of PHICH groups, and $N_{PHICH}^{seq}$ is a quantity of orthogonal sequences in each PHICH group.

With reference to the first aspect, in a fifth possible implementation of the first aspect, the determining, by a network device, the one or more PHICH resources includes:

determining, by the network device, a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to formulas $n\_u_{PHICH}^{group}=\mod(I\_u+n\_u, N_{PHICH}^{group})+I_{PHICH}N_{PHICH}^{group}$ and $n\_u_{PHICH}^{seq}=\mod(\lfloor I\_u/N_{PHICH}^{group}\rfloor+n\_u, 2N_{SF}^{PHICH})$, where mod( ) is a mod function; ⌊ ⌋ is a floor function; $N_{PHICH}^{group}$ is a quantity of PHICH groups, and a value of $I_{PHICH}$ is 0 or 1; $N_{SF}^{PHICH}$ is a PHICH spreading factor, and a value is 2 or 4; and n_u and I_u are adjustment parameters, and values are zero or positive integers.

With reference to the fifth possible implementation of the first aspect, in a sixth possible implementation of the first aspect, the method further includes:

sending, by the network device, n_u and I_u to the user equipment.

With reference to the first aspect, in a seventh possible implementation of the first aspect, the determining, by a network device, the multiple PHICH resources includes:

determining, by the network device, a number $n\_u_{PHICH}^{group}$ of a PHICH group of a first PHICH resource, and a number $n\_u_{PHICH}^{seq}$ of an orthogonal sequence in the PHICH group $n\_u_{PHICH}^{group}$, where in this case, a number of a PHICH group of an $M^{th}$ PHICH resource is $n\_u_{PHICH}^{group}+\Delta_M^{group}$, and a number of an orthogonal sequence in an $M^{th}$ PHICH group $n\_u_{PHICH}^{group}+\Delta_M^{group}$ is $n\_u_{PHICH}^{seq}+\Delta_M^{seq}$; M is a positive integer greater than 1; and $\Delta_M^{group}$ and $\Delta_M^{seq}$ are adjustment parameters, and values are integers.

With reference to any one of the first aspect, or the first to the seventh possible implementations of the first aspect, in an eighth possible implementation of the first aspect, carrying, by the first subframe, a first signal, where the first signal is used to indicate that the second subframe is an incomplete subframe.

According to a second aspect, an information transmission method is provided, including:

receiving, by user equipment, a first subframe that is sent by a network device;

determining, by the user equipment, one or more physical hybrid automatic repeat request indicator channel PHICH resources of the first subframe, where the one or more physical hybrid automatic repeat request indicator channel PHICH resources indicate a quantity of orthogonal frequency division multiplexing OFDM symbols included in a second subframe on an unlicensed carrier; and receiving, by the user equipment according to the quantity of the OFDM symbols included in the second subframe, the second subframe that is sent by the network device, where the first subframe includes M orthogonal frequency division multiplexing OFDM symbols, the second subframe includes N OFDM symbols, M and N are positive integers, and M≥N.

With reference to the second aspect, in a first possible implementation of the second aspect, the determining, by the user equipment, the one or more PHICH resources includes:

determining, by the user equipment, a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$.

With reference to the second aspect, in a second possible implementation of the second aspect, the determining, by the user equipment, the one or more PHICH resources includes:

receiving, by the user equipment, a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ that are sent by the network device.

With reference to the second aspect, in a third possible implementation of the second aspect, the determining, by the user equipment, the one or more PHICH resources includes:

determining, by the user equipment, a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to a cell identity.

With reference to the second aspect, in a fourth possible implementation of the second aspect, the determining, by the user equipment, the one or more PHICH resources includes:

determining, by the user equipment, a number $n\_u_{PHICH}^{group}$ of a PHICH group of the one or more PHICH resources according to a formula $n\_u_{PHICH}^{group}=$ mod(Cell_ID, $N_{PHICH}^{group}$), $n\_u_{PHICH}^{group}=$mod(F(Cell_ID),$N_{PHICH}^{group}$), or $n\_u_{PHICH}^{group}=$mod(F(Cell_ID,Operator_ID),$N_{PHICH}^{group}$); and determining, by the user equipment, a number $n\_u_{PHICH}^{seq}$ of an orthogonal sequence in the PHICH group $n\_u_{PHICH}^{group}$ of the one or more PHICH resources according to a formula $n\_u_{PHICH}^{seq}=$mod(Cell_ID,$N_{PHICH}^{seq}$), $n\_u_{PHICH}^{seq}=$mod(F(Cell_ID),$N_{PHICH}^{seq}$), or $n\_u_{PHICH}^{seq}=$mod(F(Cell_ID,Operator_ID),$N_{PHICH}^{seq}$), where mod( ) is a mod function, Cell_ID is a cell identity, F(Cell_ID) is a function in which the cell identity is an independent variable, Operator_ID is an operator identifier, F(Cell_ID,Operator_ID) is a function in which the cell identity and the operator identifier are independent variables, $N_{PHICH}^{group}$ is a quantity of PHICH groups, and $N_{PHICH}^{seq}$ is a quantity of orthogonal sequences in each PHICH group.

With reference to the second aspect, in a fifth possible implementation of the second aspect, the determining, by the user equipment, the one or more PHICH resources includes:

determining, by the user equipment, a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to formulas $n\_u_{PHICH}^{group}=$mod(I_u+n_u,$N_{PHICH}^{group}$)+$I_{PHICH}N_{PHICH}^{group}$ and $n\_u_{PHICH}^{seq}=$mod($\lfloor I\_u/N_{PHICH}^{group}\rfloor$+ n_u,$2N_{SF}^{PHICH}$), where mod( ) is a mod function; $\lfloor \rfloor$ is a floor function; $N_{PHICH}^{group}$ is a quantity of PHICH groups, and a value of $I_{PHICH}$ is 0 or 1; $N_{SF}^{PHICH}$ is a PHICH spreading factor, and a value is 2 or 4; and n_u and I_u are adjustment parameters, and values are zero or positive integers.

With reference to the fifth possible implementation of the second aspect, in a sixth possible implementation of the second aspect, the method further includes:

receiving, by the user equipment, n_u and I_u that are sent by the network device.

With reference to the second aspect, in a seventh possible implementation of the second aspect, the determining, by the user equipment, the one or more PHICH resources includes:

determining, by the user equipment, a number $n\_u_{PHICH}^{group}$ of a PHICH group of a first PHICH resource, and a number $n\_u_{PHICH}^{seq}$ of an orthogonal sequence in the PHICH group $n\_u_{PHICH}^{group}$, where in this case, a number of a PHICH group of an $M^{th}$ PHICH resource is $n\_u_{PHICH}^{group}+\Delta_M^{group}$, and a number of an orthogonal sequence in an $M^{th}$ PHICH group $n\_u_{PHICH}^{group}+\Delta_M^{group}$ is $n\_u_{PHICH}^{seq}+\Delta_M^{seq}$; M is a positive integer greater than 1; and $\Delta_M^{group}$ and $\Delta_M^{seq}$ are adjustment parameters, and values are integers.

With reference to any one of the second aspect, or the first to the seventh possible implementations of the second aspect, in an eighth possible implementation of the second aspect, carrying, by the first subframe, a first signal, where the first signal is used to indicate that the second subframe is an incomplete subframe.

According to a third aspect, a network device is provided, including:

a resource management unit, configured to determine one or more physical hybrid automatic repeat request indicator channel PHICH resources of a first subframe, where the one or more physical hybrid automatic repeat request indicator channel PHICH resources indicate a quantity of orthogonal frequency division multiplexing OFDM symbols included in a second subframe on an unlicensed carrier; and a sending unit, configured to send the first subframe and the second subframe to user equipment, where the second subframe is sent before the first subframe, the first subframe includes M orthogonal frequency division multiplexing OFDM symbols, the second subframe includes N OFDM symbols, M and N are positive integers, and M≥N.

With reference to the third aspect, in a first possible implementation of the third aspect, the resource management unit is specifically configured to determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$.

With reference to the first possible implementation of the third aspect, in a second possible implementation of the third aspect, the sending unit is further configured to send the number $n\_u_{PHICH}^{group}$ of the PHICH group of the one or more PHICH resources, and the number $n\_u_{PHICH}^{seq}$ of the orthogonal sequence in the PHICH group $n\_u_{PHICH}^{group}$ to the user equipment.

With reference to the third aspect, in a third possible implementation of the third aspect, the resource management unit is specifically configured to determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to a cell identity.

With reference to the third aspect, in a fourth possible implementation of the third aspect, the resource management unit is specifically configured to: determine a number $n\_u_{PHICH}^{group}$ of a PHICH group of the one or more PHICH resources according to a formula $n\_u_{PHICH}^{group}=\mathrm{mod}(\mathrm{Cell\_ID},N_{PHICH}^{group})$, $n\_u_{PHICH}^{group}=\mathrm{mod}(F(\mathrm{Cell\_ID}),N_{PHICH}^{group})$, or $n\_u_{PHICH}^{group}=\mathrm{mod}(F(\mathrm{Cell\_ID},\mathrm{Operator\_ID}),N_{PHICH}^{group})$; and determine a number $n\_u_{PHICH}^{seq}$ of an orthogonal sequence in the PHICH group $n\_u_{PHICH}^{group}$ of the one or more PHICH resources according to a formula $n\_u_{PHICH}^{group}=\mathrm{mod}(\mathrm{Cell\_ID},N_{PHICH}^{seq})$ $n\_u_{PHICH}^{seq}=\mathrm{mod}(F(\mathrm{Cell\_ID}),N_{PHICH}^{seq})$, or $n\_u_{PHICH}^{seq}=\mathrm{mod}(F(\mathrm{Cell\_ID},\mathrm{Operator\_ID}),N_{PHICH}^{seq})$, where mod( ) is a mod function, Cell_ID is a cell identity, F(Cell_ID) is a function in which the cell identity is an independent variable, Operator_ID is an operator identifier, F(Cell_ID,Operator_ID) is a function in which the cell identity and the operator identifier are independent variables, $N_{PHICH}^{group}$ is a quantity of PHICH groups, and $N_{PHICH}^{seq}$ is a quantity of orthogonal sequences in each PHICH group.

With reference to the third aspect, in a fifth possible implementation of the third aspect, the resource management unit is specifically configured to determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to formulas $n\_u_{PHICH}^{group}=\mathrm{mod}(I\_u+n\_u,N_{PHICH}^{group})+I_{PHICH}N_{PHICH}^{group}$ and $n\_u_{PHICH}^{seq}=\mathrm{mod}(\lfloor I\_u/N_{PHICH}^{group}\rfloor+n\_u,2N_{SF}^{PHICH})$, where mod( ) is a mod function; $\lfloor\ \rfloor$ is a floor function; $N_{PHICH}^{group}$ is a quantity of PHICH groups, and a value of $I_{PHICH}$ is 0 or 1; $N_{SF}^{PHICH}$ is a PHICH spreading factor, and a value is 2 or 4; and n_u and I_u are adjustment parameters, and values are zero or positive integers.

With reference to the fifth possible implementation of the third aspect, in a sixth possible implementation of the third aspect, the sending unit is further configured to send n_u and I_u to the user equipment.

With reference to the third aspect, in a seventh possible implementation of the third aspect, the resource management unit is specifically configured to determine a number $n\_u_{PHICH}^{group}$ of a PHICH group of a first PHICH resource, and a number $n\_u_{PHICH}^{seq}$ of an orthogonal sequence in the PHICH group $n\_u_{PHICH}^{group}$, where in this case, a number of a PHICH group of an $M^{th}$ PHICH resource is $n\_u_{PHICH}^{group}+\Delta_M^{group}$, and a number of an orthogonal sequence in an $M^{th}$ PHICH group $n\_u_{PHICH}^{group}+\Delta_M^{group}$ is $n\_u_{PHICH}^{seq}+\Delta_M^{seq}$; M is a positive integer greater than 1; and $\Delta_M^{group}$ and $\Delta_M^{seq}$ are adjustment parameters, and values are integers.

With reference to any one of the third aspect, or the first to the seventh possible implementations of the third aspect, in an eighth possible implementation of the third aspect, carrying, by the first subframe, a first signal, where the first signal is used to indicate that the second subframe is an incomplete subframe.

According to a fourth aspect, user equipment is provided, including:

a receiving unit, configured to receive a first subframe that is sent by a network device; and a resource management unit, configured to determine one or more physical hybrid automatic repeat request indicator channel PHICH resources of the first subframe, where the one or more physical hybrid automatic repeat request indicator channel PHICH resources indicate a quantity of orthogonal frequency division multiplexing OFDM symbols included in a second subframe on an unlicensed carrier; where the receiving unit is further configured to receive, according to the quantity of the OFDM symbols included in the second subframe, the second subframe that is sent by the network device, where the first subframe includes M orthogonal frequency division multiplexing OFDM symbols, the second subframe includes N OFDM symbols, M and N are positive integers, and M≥N.

With reference to the fourth aspect, in a first possible implementation of the fourth aspect, the resource management unit is specifically configured to determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$.

With reference to the fourth aspect, in a second possible implementation of the fourth aspect, the receiving unit is further configured to: receive a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ that are sent by the network device, and transmit the received number $n\_u_{PHICH}^{group}$ of the PHICH group of the one or more PHICH resources, and the received number $n\_u_{PHICH}^{seq}$ of the orthogonal sequence in the PHICH group $n\_u_{PHICH}^{group}$ to the resource management unit; and the resource management unit is further configured to receive the number $n\_u_{PHICH}^{group}$ of the PHICH group of the one or more PHICH resources, and the number $n\_u_{PHICH}^{seq}$ of the orthogonal sequence in the PHICH group $n\_u_{PHICH}^{group}$ that are transmitted by the receiving unit.

With reference to the fourth aspect, in a third possible implementation of the fourth aspect, the resource management unit is specifically configured to determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to a cell identity.

With reference to the fourth aspect, in a fourth possible implementation of the fourth aspect, the resource management unit is specifically configured to: determine a number $n\_u_{PHICH}^{group}$ of a PHICH group of the one or more PHICH resources according to a formula $n\_u_{PHICH}^{group} = \mathrm{mod}(Cell\_ID, N_{PHICH}^{group})$, $n\_u_{PHICH}^{group} = \mathrm{mod}(F(Cell\_ID), N_{PHICH}^{group})$, or $n\_u_{PHICH}^{group} = \mathrm{mod}(F(Cell\_ID, Operator\_ID), N_{PHICH}^{group})$; and determine a number $n\_u_{PHICH}^{seq}$ of an orthogonal sequence in the PHICH group $n\_u_{PHICH}^{group}$ of the one or more PHICH resources according to a formula $n\_u_{PHICH}^{seq} = \mathrm{mod}(Cell\_ID, N_{PHICH}^{seq})$ $n\_u_{PHICH}^{seq} = \mathrm{mod}(F(Cell\_ID), N_{PHICH}^{seq})$, or $n\_u_{PHICH}^{group} = \mathrm{mod}(F(Cell\_ID, Operator\_ID), N_{PHICH}^{seq})$, where mod( ) is a mod function, Cell_ID is a cell identity, F(Cell_ID) is a function in which the cell identity is an independent variable, Operator_ID is an operator identifier, F(Cell_ID,Operator_ID) is a function in which the cell identity and the operator identifier are independent variables, $N_{PHICH}^{group}$ is a quantity of PHICH groups, and $N_{PHICH}^{group}$ is a quantity of orthogonal sequences in each PHICH group.

With reference to the fourth aspect, in a fifth possible implementation of the fourth aspect, the resource management unit is specifically configured to determine a number $n\_u_{PHICH}^{group}$ of a PHICH group of the one or more PHICH resources, and a number $n\_u_{PHICH}^{group}$ of an orthogonal sequence in the PHICH group $n\_u_{PHICH}^{group}$ according to formulas $n\_u_{PHICH}^{group} = \mathrm{mod}(I\_u + n\_u, N_{PHICH}^{group}) + I_{PHICH} N_{PHICH}^{group}$ and $n\_u_{PHICH}^{seq} = \mathrm{mod}(\lfloor I\_u/N_{PHICH}^{group}\rfloor + n\_u, 2N_{SF}^{PHICH})$, where mod( ) is a mod function; $\lfloor \ \rfloor$ is a floor function; $N_{PHICH}^{group}$ is a quantity of PHICH groups, and a value of $I_{PHICH}$ is 0 or 1; $N_{SF}^{PHICH}$ is a PHICH spreading factor, and a value is 2 or 4; and n_u and I_u are adjustment parameters, and values are zero or positive integers.

With reference to the fifth possible implementation of the fourth aspect, in a sixth possible implementation of the fourth aspect, the receiving unit is further configured to receive n_u and I_u that are sent by the network device.

With reference to the fourth aspect, in a seventh possible implementation of the fourth aspect, the resource management unit is specifically configured to determine a number $n\_u_{PHICH}^{group}$ of a PHICH group of a first PHICH resource, and a number $n\_u_{PHICH}^{seq}$ of an orthogonal sequence in the PHICH group $n\_u_{PHICH}^{group}$, where in this case, a number of a PHICH group of an $M^{th}$ PHICH resource is $n\_u_{PHICH}^{group} + \Delta_M^{group}$, and a number of an orthogonal sequence in an $M^{th}$ PHICH group $n\_u_{PHICH}^{group} + \Delta_M^{group}$ is $n\_u_{PHICH}^{seq} + \Delta_M^{seq}$; M is a positive integer greater than 1; and $\Delta_M^{group}$ and $\Delta_M^{seq}$ are adjustment parameters, and values are integers.

With reference to any one of the fourth aspect, or the first to the seventh possible implementations of the fourth aspect, in an eighth possible implementation of the fourth aspect, carrying, by the first subframe, a first signal, where the first signal is used to indicate that the second subframe is an incomplete subframe.

According to a fifth aspect, a network device is provided, including a processor, a memory, a bus, and a transmitter, where the processor, the memory, and the transmitter are connected to each other by using the bus; the processor is configured to determine one or more physical hybrid automatic repeat request indicator channel PHICH resources of a first subframe, where the one or more physical hybrid automatic repeat request indicator channel PHICH resources indicate a quantity of orthogonal frequency division multiplexing OFDM symbols included in a second subframe on an unlicensed carrier; and the transmitter is configured to send the first subframe and the second subframe to user equipment, where the second subframe is sent before the first subframe, the first subframe includes M orthogonal frequency division multiplexing OFDM symbols, the second subframe includes N OFDM symbols, M and N are positive integers, and M≥N.

With reference to the fifth aspect, in a first possible implementation of the fifth aspect, the processor is specifically configured to determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$.

With reference to the first possible implementation of the fifth aspect, in a second possible implementation of the fifth aspect, the transmitter is further configured to send the number $n\_u_{PHICH}^{group}$ of the PHICH group of the one or more PHICH resources, and the number $n\_u_{PHICH}^{seq}$ of the orthogonal sequence in the PHICH group $n\_u_{PHICH}^{group}$ to the user equipment.

With reference to the fifth aspect, in a third possible implementation of the fifth aspect, the processor is specifically configured to determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to a cell identity.

With reference to the fifth aspect, in a fourth possible implementation of the fifth aspect, the processor is specifically configured to: determine a number $n\_u_{PHICH}^{group}$ of a PHICH group of the one or more PHICH resources according to a formula $n\_u_{PHICH}^{group} = \mathrm{mod}(Cell\_ID, N_{PHICH}^{group})$, $n\_u_{PHICH}^{group} = \mathrm{mod}(F(Cell\_ID), N_{PHICH}^{group})$, or $n\_u_{PHICH}^{group} = \mathrm{mod}(F(Cell\_ID, Operator\_ID), N_{PHICH}^{group})$; and determine a number $n\_u_{PHICH}^{seq}$ of an orthogonal sequence in the PHICH group $n\_u_{PHICH}^{group}$ of the one or more PHICH resources according to a formula $n\_u_{PHICH}^{seq} = \mathrm{mod}(Cell\_ID, N_{PHICH}^{seq})$, $n\_u_{PHICH}^{seq} = \mathrm{mod}(F(Cell\_ID), N_{PHICH}^{seq})$, or $n\_u_{PHICH}^{seq} = \mathrm{mod}(F(Cell\_ID, Operator\_ID), N_{PHICH}^{seq})$, where mod( ) is a mod function, Cell_ID is a cell identity, F(Cell_ID) is a function in which the cell identity is an independent variable, Operator_ID is an operator identifier, F(Cell_ID,Operator_ID) is a function in which the cell identity and the operator identifier are independent variables, $N_{PHICH}^{group}$ is a quantity of PHICH groups, and $N_{PHICH}^{seq}$ is a quantity of orthogonal sequences in each PHICH group.

With reference to the fifth aspect, in a fifth possible implementation of the fifth aspect, the processor is specifically configured to determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to formulas $n\_u_{PHICH}^{group} = \mathrm{mod}(I\_u + n\_u, N_{PHICH}^{group}) + I_{PHICH} N_{PHICH}^{group}$ and $n\_u_{PHICH}^{seq} = \mathrm{mod}(\lfloor I\_u/N_{PHICH}^{group}\rfloor + n\_u, 2N_{SF}^{PHICH})$, where mod( ) is a mod function; $\lfloor \ \rfloor$ is a floor function; $N_{PHICH}^{group}$ is a quantity of PHICH groups, and a value of $I_{PHICH}$ is 0 or 1; $N_{SF}^{PHICH}$ is a PHICH spreading factor, and a value is 2 or 4; and n_u and I_u are adjustment parameters, and values are zero or positive integers.

With reference to the fifth possible implementation of the fifth aspect, in a sixth possible implementation of the fifth aspect, the transmitter is further configured to send n_u and I_u to the user equipment.

With reference to the fifth aspect, in a seventh possible implementation of the fifth aspect, the processor is specifically configured to determine a number $n\_u_{PHICH}^{group}$ of a PHICH group of a first PHICH resource, and a number $n\_u_{PHICH}^{seq}$ of an orthogonal sequence in the PHICH group $n\_u_{PHICH}^{group}$, where in this case, a number of a PHICH group of an $M^{th}$ PHICH resource is $n\_u_{PHICH}^{group}+\Delta_M^{group}$, and a number of an orthogonal sequence in an $M^{th}$ PHICH group $n\_u_{PHICH}^{group}+\Delta_M^{group}$ is $n\_u_{PHICH}^{seq}+\Delta_M^{seq}$; M is a positive integer greater than 1; and $\Delta_M^{group}$ and $\Delta_M^{seq}$ are adjustment parameters, and values are integers.

With reference to any one of the fifth aspect, or the first to the seventh possible implementations of the fifth aspect, in an eighth possible implementation of the fifth aspect, carrying, by the first subframe, a first signal, where the first signal is used to indicate that the second subframe is an incomplete subframe.

According to a sixth aspect, user equipment is provided, including a processor, a memory, a bus, and a receiver, where the processor, the memory, and the receiver are connected to each other by using the bus; the receiver is configured to receive a first subframe that is sent by a network device; the processor is configured to determine one or more physical hybrid automatic repeat request indicator channel PHICH resources of the first subframe, where the one or more physical hybrid automatic repeat request indicator channel PHICH resources indicate a quantity of orthogonal frequency division multiplexing OFDM symbols included in a second subframe on an unlicensed carrier; and the receiver is further configured to receive, according to the quantity of the OFDM symbols included in the second subframe, the second subframe that is sent by the network device, where the first subframe includes M orthogonal frequency division multiplexing OFDM symbols, the second subframe includes N OFDM symbols, M and N are positive integers, and M≥N.

With reference to the sixth aspect, in a first possible implementation of the sixth aspect, the processor is specifically configured to determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$.

With reference to the sixth aspect, in a second possible implementation of the sixth aspect, the processor is further configured to receive, by using the receiver, a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ that are sent by the network device.

With reference to the sixth aspect, in a third possible implementation of the sixth aspect, the processor is specifically configured to determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to a cell identity.

With reference to the sixth aspect, in a fourth possible implementation of the sixth aspect, the processor is specifically configured to: determine a number $n\_u_{PHICH}^{group}$ of a PHICH group of the one or more PHICH resources according to a formula $n\_u_{PHICH}^{group}=\mathrm{mod}(Cell\_ID, N_{PHICH}^{group})$, $n\_u_{PHICH}^{group}=\mathrm{mod}(F(Cell\_ID), N_{PHICH}^{group})$, or $n\_u_{PHICH}^{group}=\mathrm{mod}(F(Cell\_ID, Operator\_ID), N_{PHICH}^{group})$; and determine a number $n\_u_{PHICH}^{seq}$ of an orthogonal sequence in the PHICH group $n\_u_{PHICH}^{group}$ of the one or more PHICH resources according to a formula $n\_u_{PHICH}^{seq}=\mathrm{mod}(Cell\_ID, N_{PHICH}^{seq})$, $n\_u_{PHICH}^{seq}=\mathrm{mod}(Cell\_ID, N_{PHICH}^{seq})$, or $n\_u_{PHICH}^{seq}=\mathrm{mod}(F(Cell\_ID, Operator\_ID), N_{PHICH}^{seq})$, where mod( ) is a mod function, Cell_ID is a cell identity, F(Cell_ID) is a function in which the cell identity is an independent variable, Operator_ID is an operator identifier, F(Cell_ID,Operator_ID) is a function in which the cell identity and the operator identifier are independent variables, $N_{PHICH}^{group}$ is a quantity of PHICH groups, and $N_{PHICH}^{seq}$ is a quantity of orthogonal sequences in each PHICH group.

With reference to the sixth aspect, in a fifth possible implementation of the sixth aspect, the processor is specifically configured to determine a number $n\_u_{PHICH}^{group}$ of a PHICH group of the one or more PHICH resources, and a number $n\_u_{PHICH}^{group}$ of an orthogonal sequence in the PHICH group $n\_u_{PHICH}^{group}$ according to formulas $n\_u_{PHICH}^{group}=\mathrm{mod}(I\_u+n\_u, N_{PHICH}^{group})+I_{PHICH} N_{PHICH}^{group}$ and $n\_u_{PHICH}^{seq}=\mathrm{mod}(\lfloor I\_u/N_{PHICH}^{group}\rfloor+n\_u, 2N_{SF}^{PHICH})$, where mod( ) is a mod function; $\lfloor\ \rfloor$ is a floor function; $N_{PHICH}^{group}$ is a quantity of PHICH groups, and a value of $I_{PHICH}$ is 0 or 1; $N_{SF}^{PHICH}$ is a PHICH spreading factor, and a value is 2 or 4; and n_u and I_u are adjustment parameters, and values are zero or positive integers.

With reference to the fifth possible implementation of the sixth aspect, in a sixth possible implementation of the sixth aspect, the receiver is further configured to receive n_u and I_u that are sent by the network device.

With reference to the sixth aspect, in a seventh possible implementation of the sixth aspect, the processor is specifically configured to determine a number $n\_u_{PHICH}^{group}$ of a PHICH group of a first PHICH resource, and a number $n\_u_{PHICH}^{group}$ of an orthogonal sequence in the PHICH group $n\_u_{PHICH}^{seq}$, where in this case, a number of a PHICH group of an $M^{th}$ PHICH resource is $n\_u_{PHICH}^{group}+\Delta_M^{group}$, and a number of an orthogonal sequence in an $M^{th}$ PHICH group $n\_u_{PHICH}^{group}+\Delta_M^{group}$ is $n\_u_{PHICH}^{seq}+\Delta_M^{seq}$; M is a positive integer greater than 1; and $\Delta_M^{group}$ and $\Delta_M^{seq}$ are adjustment parameters, and values are integers.

With reference to any one of the sixth aspect, or the first to the seventh possible implementations of the sixth aspect, in an eighth possible implementation of the sixth aspect, carrying, by the first subframe, a first signal, where the first signal is used to indicate that the second subframe is an incomplete subframe.

According to a seventh aspect, a wireless network system is provided, including: a network device and user equipment, where the network device is the network device according to any one of the third aspect and the possible implementations of the third aspect, and the user equipment is the user equipment according to any one of the fourth aspect and the possible implementations of the fourth aspect; or the network device is the network device according to any one of the fifth aspect and the possible implementations of the fifth aspect, and the user equipment is the user equipment according to any one of the sixth aspect and the possible implementations of the sixth aspect.

According to the information transmission method, the device, and the system that are provided in the embodiments of the present invention, a network device determines one or more PHICH resources of a first subframe, where the one or more physical hybrid automatic repeat request indicator channel PHICH resources indicate a quantity of orthogonal frequency division multiplexing OFDM symbols included in a second subframe on an unlicensed carrier; and the network device sends the first subframe and the second subframe to user equipment.

In this way, a quantity of physical resources included in the second subframe is indicated by using the PHICH resources of the first subframe. This resolves a prior-art problem that a receive end cannot determine a quantity of OFDMs included in an incomplete subframe, and cannot correctly receive the incomplete subframe.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communication (Global System of Mobile communication, GSM), a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, an LTE frequency division duplex (Frequency Division Duplex, FDD) system, an LTE time division duplex (Time Division Duplex, TDD), Universal Mobile Telecommunications System (Universal Mobile Telecommunication System, UMTS), and a Worldwide Interoperability for Microwave Access (Worldwide Interoperability for Microwave Access, WiMAX) communications system.

It should be understood that in the embodiments of the present invention, user equipment (English full name: User Equipment, UE for short) includes but is not limited to a mobile station (English full name: Mobile Station, MS for short), a mobile terminal (Mobile Terminal), a mobile telephone (Mobile Telephone), a handset (handset), a portable equipment (portable equipment), and the like. The user equipment may communicate with one or more core networks by using a radio access network (English full name: Radio Access Network, RAN for short). For example, the user equipment may be a mobile telephone (or referred to as a "cellular" phone), or a computer having a wireless communication function; the user equipment may further be a portable, pocket-sized, handheld, computer built-in, or in-vehicle mobile apparatus.

In the embodiments of the present invention, a network device may be a base station (English full name: Base Transceiver Station, BTS for short) in the GSM or CDMA, or may be a base station (NodeB) in WCDMA, or may be an evolved NodeB (English full name: evolved Node B, eNB or e-NodeB for short) in LTE. This is not limited in the embodiments of the present invention.

It should be noted that in the embodiments of the present invention, "first" and "second" are merely used for differentiation, instead of imposing a limitation in the embodiments of the present invention.

Figure 1:
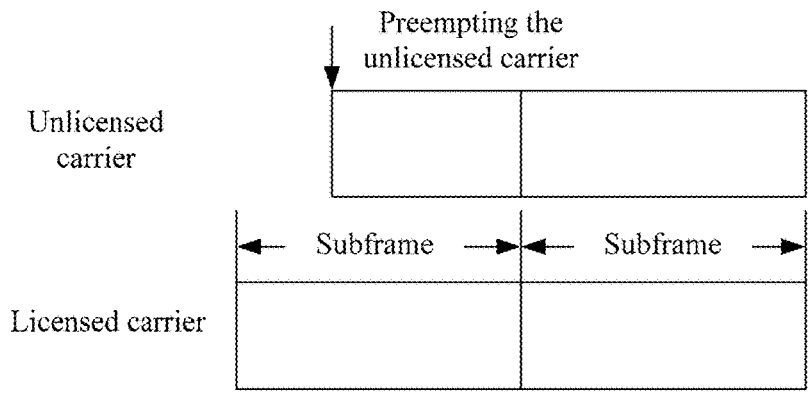
FIG. 1 is a schematic structural diagram of preempting a subframe of an unlicensed spectrum in the prior art.
Figure 2:
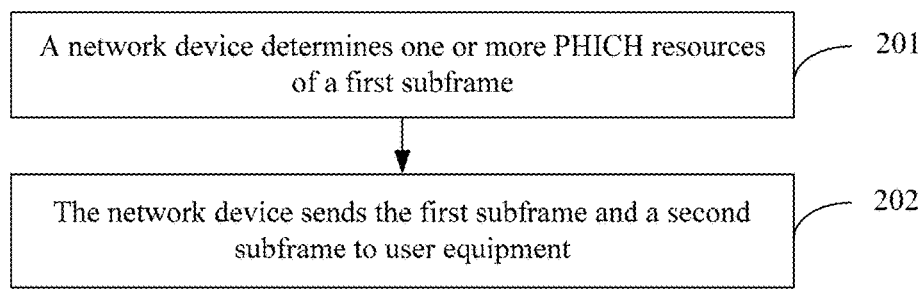
FIG. 2 is a schematic flowchart of an information transmission method according to an embodiment of the present invention.

An embodiment of the present invention provides an information transmission method. As shown in FIG. 2, the method includes the following steps:

201. A network device determines one or more PHICH (Physical Hybrid Automatic Repeat Request Indicator Channel, physical hybrid automatic repeat request indicator channel) resources of the first subframe.

The one or more PHICH resources indicate a quantity of orthogonal frequency division multiplexing OFDM (Orthogonal Frequency Division Multiplexing, orthogonal frequency division multiplexing) symbols included in a second subframe on an unlicensed carrier.

Specifically, optionally, the network device determines a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$. Further, optionally, a PHICH resource may be an RE (Resource Element, resource element). The PHICH resource may include multiple groups, and a group includes multiple REs. The network device may determine an RE according to a number $n\_u_{PHICH}^{group}$ of a PHICH group and a number $n\_u_{PHICH}^{group}$ of an orthogonal sequence in the PHICH group $n\_u_{PHICH}^{group}$. Further, the number $n\_u_{PHICH}^{group}$ of the PHICH group of the one or more PHICH resources, and the number $n\_u_{PHICH}^{group}$ of the orthogonal sequence in the PHICH group $n\_u_{PHICH}^{group}$ may be preset. A quantity of REs that need to be configured is equal to a quantity of bits that need to represent a quantity of physical resources included in the second subframe.

Optionally, the network device may send the number $n\_u_{PHICH}^{group}$ of the PHICH group of the one or more PHICH resources, and the number $n\_u_{PHICH}^{group}$ of the orthogonal sequence in the PHICH group $n\_u_{PHICH}^{group}$ to the user equipment. Therefore, the user equipment determines the one or more PHICH resources according to the number $n\_u_{PHICH}^{group}$ of the PHICH group of the one or more PHICH resources, and the number $n\_u_{PHICH}^{seq}$ of the orthogonal sequence in the PHICH group $n\_u_{PHICH}^{group}$. That is, the network device may send both or one of the number $n\_u_{PHICH}^{group}$ of the PHICH group and the number $n\_u_{PHICH}^{group}$ of the orthogonal sequence to the user equipment, and the user equipment may obtain a number that is not sent by the network device.

Optionally, the network device may determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to a cell identity. Alternatively, the network device may determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to a cell identity and an operator identifier.

This embodiment of the present invention lists three specific manners of determining a number $n\_u_{PHICH}^{group}$ of a PHICH group of the one or more PHICH resources, and a number $n\_u_{PHICH}^{group}$ of an orthogonal sequence in the PHICH group $n\_u_{PHICH}^{group}$ herein. Certainly, the manners are merely examples used for description herein, and it does not indicate that the present invention is limited thereto.

1. First manner: The network device determines a number $n\_u_{PHICH}^{group}$ of a PHICH group of the one or more PHICH resources according to a formula $n\_u_{PHICH}^{group}=\text{mod}(\text{Cell\_ID},N_{PHICH}^{group})$, $n\_u_{PHICH}^{group}=\text{mod}(F(\text{Cell\_ID}),N_{PHICH}^{group})$, or $n\_u_{PHICH}^{group}=\text{mod}(F(\text{Cell\_ID},\text{Operator\_ID}),N_{PHICH}^{group})$.

The network device determines a number $n\_u_{PHICH}^{group}$ of an orthogonal sequence in the PHICH group $n\_u_{PHICH}^{group}$ of the one or more PHICH $n\_u_{PHICH}^{seq}=\text{mod}(\text{Cell\_ID},N_{PHICH}^{seq})$ resources according to a formula $n\_u_{PHICH}^{seq}=\text{mod}(\text{Cell\_},N_{PHICH}^{seq})$, $n\_u_{PHICH}^{seq}=\text{mod}(F(\text{Cell\_ID}),N_{PHICH}^{seq})$, or $n\_u_{PHICH}^{seq}=\text{mod}(F(\text{Cell\_ID},\text{Operator\_ID}),N_{PHICH}^{seq})$.

mod( ) is a mod function, Cell_ID is a cell identity, F(Cell_ID) is a function in which the cell identity is an independent variable, Operator_ID is an operator identifier, F(Cell_ID,Operator_ID) is a function in which the cell identity and the operator identifier are independent variables, $N_{PHICH}^{group}$ is a quantity of PHICH groups, and $N_{PHICH}^{group}$ is a quantity of orthogonal sequences in each PHICH group.

2. Second manner: The network device determines a number $n\_u_{PHICH}^{group}$ of a PHICH group of the one or more PHICH resources, and a number $n\_u_{PHICH}^{group}$ of an orthogonal sequence in the PHICH group $n\_u_{PHICH}^{group}$ according to formulas $n\_u_{PHICH}^{group}=\text{mod}(I\_u+n\_u,N_{PHICH}^{group})+I_{PHICH}N_{PHICH}^{group}$ and $n\_u_{PHICH}^{seq}=\text{mod}(\lfloor I\_u/N_{PHICH}^{group}\rfloor+n\_u,2N_{SF}^{PHICH})$.

mod( ) is a mod function; $\lfloor\ \rfloor$ is a floor function; $N_{PHICH}^{group}$ is a quantity of PHICH groups, and a value of $I_{PHICH}$ is 0 or 1; $N_{SF}^{PHICH}$ is a PHICH spreading factor, and a value is 2 or 4; and n_u and I_u are adjustment parameters, and values are zero or positive integers.

Optionally, the network device may further send n_u and I_u to the user equipment.

3. Third manner: The network device determines a number $n\_u_{PHICH}^{group}$ of a PHICH group of a first PHICH resource, and a number $n\_u_{PHICH}^{seq}$ of an orthogonal sequence in the PHICH group $n\_u_{PHICH}^{group}$. In this case, a number of a PHICH group of an $M^{th}$ PHICH resource is $n\_u_{PHICH}^{group}+\Delta_M^{group}$, and a number of an orthogonal sequence in an $M^{th}$ PHICH group $n\_u_{PHICH}^{group}+\Delta_M^{group}$ is $n\_u_{PHICH}^{seq}+\Delta_M^{seq}$; M is a positive integer greater than 1; and $\Delta_M^{group}$ and $\Delta_M^{seq}$ are adjustment parameters, and values are integers.

202. The network device sends a first subframe and a second subframe to the user equipment.

The second subframe is sent before the first subframe. The first subframe includes M OFDM symbols, and the second subframe includes N OFDM symbols, where M and N are positive integers, and M≥N.

Optionally, the first subframe may carry a first signal, where the first signal is used to indicate that the second subframe is an incomplete subframe.

It should be noted that the network device may send the first subframe and the second subframe to the user equipment by means of unicast or broadcast. This is not limited in the present invention.

According to the information transmission method provided in this embodiment of the present invention, a network device determines one or more PHICH resources of a first subframe, where the one or more physical hybrid automatic repeat request indicator channel PHICH resources indicate a quantity of orthogonal frequency division multiplexing OFDM symbols included in a second subframe on an unlicensed carrier; and the network device sends the first subframe and the second subframe to user equipment. In this way, a quantity of physical resources included in the second subframe is indicated by using the PHICH resources of the first subframe. This resolves a prior-art problem that a receive end cannot determine a quantity of OFDMs included in an incomplete subframe, and cannot correctly receive the incomplete subframe.

Figure 3:
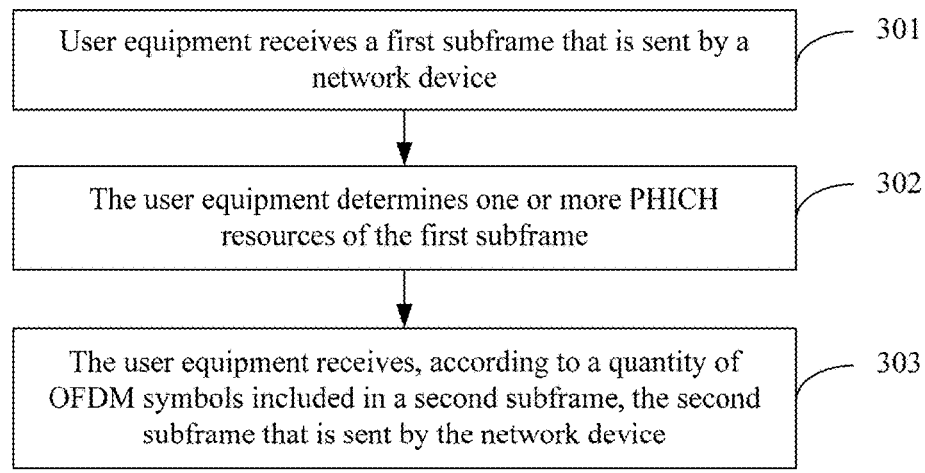
FIG. 3 is a schematic flowchart of an information transmission method according to another embodiment of the present invention.

With reference to the foregoing embodiment corresponding to FIG. 2, another embodiment of the present invention provides an information transmission method, which is corresponding to the method for a receiving side in the embodiment corresponding to FIG. 2. Referring to FIG. 3, the method includes the following steps.

301. User equipment receives a first subframe that is sent by a network device.

302. The user equipment determines one or more PHICH resources of the first subframe.

The one or more PHICH resources indicate a quantity of orthogonal frequency division multiplexing OFDM symbols included in a second subframe on an unlicensed carrier.

Specifically, optionally, the user equipment determines a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$. Further, optionally, a PHICH resource may be an RE (Resource Element, resource element). The PHICH resource may include multiple groups, and a group includes multiple REs. The user equipment may determine an RE according to a number $n\_u_{PHICH}^{group}$ of a PHICH group and a number $n\_u_{PHICH}^{seq}$ of an orthogonal sequence in the PHICH group $n\_u_{PHICH}^{group}$. Further, the number $n\_u_{PHICH}^{group}$ of the PHICH group of the one or more PHICH resources, and the number $n\_u_{PHICH}^{seq}$ of the orthogonal sequence in the PHICH group $n\_u_{PHICH}^{group}$ may be preset. A quantity of REs that need to be configured is equal to a quantity of bits that need to represent a quantity of physical resources included in the second subframe.

Optionally, the user equipment may also receive the number $n\_u_{PHICH}^{group}$ of the PHICH group of the one or more PHICH resources, and the number $n\_u_{PHICH}^{seq}$ of the orthogonal sequence in the PHICH group $n\_u_{PHICH}^{group}$ that are sent by the network device. The network device may send both or one of the number $n\_u_{PHICH}^{group}$ of the PHICH group and the number $n\_u_{PHICH}^{seq}$ of the orthogonal sequence to the user equipment, and the user equipment may obtain a number that is not sent by the network device.

Optionally, the user equipment may determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to a cell identity. Alternatively, the user equipment may determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to a cell identity and an operator identifier.

This embodiment of the present invention lists three specific manners of determining a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ herein. Certainly, the manners are merely examples used for description herein, and it does not indicate that the present invention is limited thereto.

1. First manner: The user equipment determines a number $n\_u_{PHICH}^{group}$ of a PHICH group of the one or more PHICH resources according to a formula $n\_u_{PHICH}^{group}=\mathrm{mod}(\mathrm{Cell\_ID}, N_{PHICH}^{group})$, $n\_u_{PHICH}^{group}=\mathrm{mod}(F(\mathrm{Cell\_ID}), N_{PHICH}^{group})$ or $n\_u_{PHICH}^{group}=\mathrm{mod}(F(\mathrm{Cell\_ID},\mathrm{Operator\_ID}), N_{PHICH}^{group})$.

The user equipment determines a number $n\_u_{PHICH}^{seq}$ of an orthogonal sequence in the PHICH group $n\_u_{PHICH}^{group}$ of the one or more PHICH resources according to a formula $n\_u_{PHICH}^{seq}=\mathrm{mod}(\mathrm{Cell\_ID}, N_{PHICH}^{seq})$, $n\_u_{PHICH}^{seq}=\mathrm{mod}(F(\mathrm{Cell\_ID}), N_{PHICH}^{seq})$, or $n\_u_{PHICH}^{seq}=\mathrm{mod}(F(\mathrm{Cell\_ID},\mathrm{Operator\_ID}), N_{PHICH}^{seq})$.

mod( ) is a mod function, Cell_ID is a cell identity, F(Cell_ID) is a function in which the cell identity is an independent variable, Operator_ID is an operator identifier, F(Cell_ID,Operator_ID) is a function in which the cell identity and the operator identifier are independent variables, $N_{PHICH}^{group}$ is a quantity of PHICH groups, and $N_{PHICH}^{seq}$ is a quantity of orthogonal sequences in each PHICH group.

2. Second manner: The user equipment determines a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to formulas $n\_u_{PHICH}^{group}=\mathrm{mod}(I\_u+n\_u, N_{PHICH}^{group}) + I_{PHICH} N_{PHICH}^{group}$ and $n\_u_{PHICH}^{seq}=\mathrm{mod}(\lfloor I\_u/N_{PHICH}^{group}\rfloor + n\_u, 2 N_{SF}^{PHICH})$.

mod( ) is a mod function; $\lfloor\;\rfloor$ is a floor function; $N_{PHICH}^{group}$ is a quantity of PHICH groups, and a value of $I_{PHICH}$ is 0 or 1; $N_{SF}^{PHICH}$ is a PHICH spreading factor, and a value is 2 or 4; and n_u and I_u are adjustment parameters, and values are zero or positive integers.

Optionally, the user equipment may further send n_u and I_u to the user equipment.

3. Third manner: The user equipment determines a number $n\_u_{PHICH}^{group}$ of a PHICH group of a first PHICH resource, and a number $n\_u_{PHICH}^{seq}$ of an orthogonal sequence in the PHICH group $n\_u_{PHICH}^{group}$. In this case, a number of a PHICH group of an $M^{th}$ PHICH resource is $n\_u_{PHICH}^{group}+\Delta_M^{group}$, and a number of an orthogonal sequence in an $M^{th}$ PHICH group $n\_u_{PHICH}^{group}+\Delta_M^{group}$ is $n\_u_{PHICH}^{seq}+\Delta_M^{seq}$; M is a positive integer greater than 1; and $\Delta_M^{seq}$ and $\Delta_M^{seq}$ are adjustment parameters, and values are integers.

303. The user equipment receives, according to the quantity of the OFDM symbols included in the second subframe, the second subframe that is sent by the network device.

The first subframe includes M orthogonal frequency division multiplexing OFDM symbols, and the second subframe includes N OFDM symbols, where M and N are positive integers, and M≥N.

Optionally, the first subframe may carry a first signal, where the first signal is used to indicate that the second subframe is an incomplete subframe.

According to the information transmission method provided in this embodiment of the present invention, user equipment receives a first subframe that is sent by a network device, and determines one or more PHICH resources of the first subframe, where the one or more PHICH resources indicate a quantity of OFDM symbols included in a second subframe on an unlicensed carrier; and the user equipment receives, according to the quantity of the OFDM symbols included in the second subframe, the second subframe that is sent by the network device. In this way, a quantity of physical resources included in the second subframe is indicated by using the PHICH resources of the first subframe. This resolves a prior-art problem that a receive end cannot determine a quantity of OFDM symbols included in an incomplete subframe, and cannot correctly receive the incomplete subframe.

Figure 4:
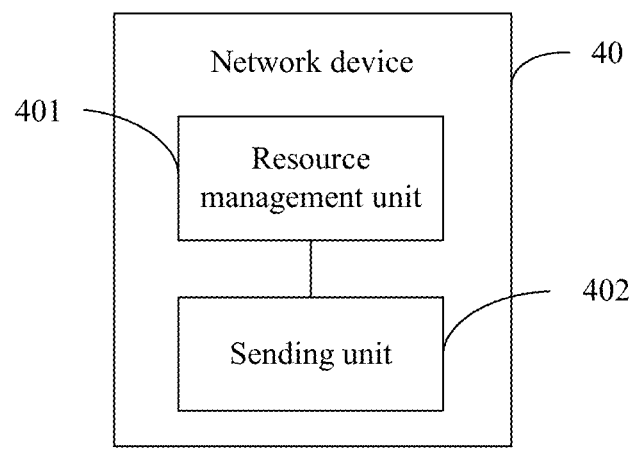
FIG. 4 is a schematic structural diagram of a network device according to an embodiment of the present invention.

Based on the foregoing embodiment corresponding to FIG. 2, an embodiment of the present invention provides a network device, which is configured to execute the information transmission method described in the foregoing embodiment corresponding to FIG. 2. Referring to FIG. 4, the network device 40 includes a resource management unit 401 and a sending unit 402.

The resource management unit 401 is configured to determine one or more physical hybrid automatic repeat request indicator channel PHICH resources of a first subframe, where the one or more physical hybrid automatic repeat request indicator channel PHICH resources indicate a quantity of orthogonal frequency division multiplexing OFDM symbols included in a second subframe on an unlicensed carrier.

The sending unit 402 is configured to send the first subframe and the second subframe to user equipment, where the second subframe is sent before the first subframe, the first subframe includes M orthogonal frequency division multiplexing OFDM symbols, the second subframe includes N OFDM symbols, M and N are positive integers, and M≥N.

Optionally, the first subframe may carry a first signal, where the first signal is used to indicate that the second subframe is an incomplete subframe.

Optionally, the resource management unit 401 is specifically configured to determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$.

Further, optionally, the sending unit 402 is further configured to send the number $n\_u_{PHICH}^{group}$ of the PHICH group of the one or more PHICH resources, and the number $n\_u_{PHICH}^{group}$ of the orthogonal sequence in the PHICH group $n\_u_{PHICH}^{group}$ to the user equipment.

Optionally, the resource management unit 401 is specifically configured to determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to a cell identity.

Three application scenarios are listed in this embodiment to describe in detail determining of a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$. Certainly, the application scenarios are merely examples used for description herein, and it does not indicate that the present invention is limited thereto.

Optionally, in a first application scenario, the resource management unit 401 is specifically configured to: determine a number $n\_u_{PHICH}^{group}$ of a PHICH group of the one or more PHICH resources according to a formula $n\_u_{PHICH}^{group}=\text{mod}(Cell\_ID, N_{PHICH}^{group})$, $n\_u_{PHICH}^{group}=\text{mod}(F(Cell\_ID), N_{PHICH}^{group})$, or $n\_u_{PHICH}^{group}=\text{mod}(F(Cell\_ID, Operator\_ID), N_{PHICH}^{group})$; or determine a number $n\_u_{PHICH}^{seq}$ of an orthogonal sequence in the PHICH group $n\_u_{PHICH}^{group}$ of the one or more PHICH resources according to a formula $n\_u_{PHICH}^{seq}=\text{mod}(Cell\_ID, N_{PHICH}^{seq})$, $n\_u_{PHICH}^{seq}=\text{mod}(F(Cell\_ID), N_{PHICH}^{seq})$, or $n\_u_{PHICH}^{seq}=\text{mod}(F(Cell\_ID, Operator\_ID), N_{PHICH}^{seq})$.

mod( ) is a mod function, Cell_ID is a cell identity, F(Cell_ID) is a function in which the cell identity is an independent variable, Operator_ID is an operator identifier, F(Cell_ID,Operator_ID) is a function in which the cell identity and the operator identifier are independent variables, $N_{PHICH}^{group}$ is a quantity of PHICH groups, and $N_{PHICH}^{seq}$ is a quantity of orthogonal sequences in each PHICH group.

Optionally, in a second application scenario, the resource management unit 401 is specifically configured to determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to formulas $n\_u_{PHICH}^{group}=\text{mod}(I\_u+n\_u, N_{PHICH}^{group})+I_{PHICH}N_{PHICH}^{group}$ and $n\_u_{PHICH}^{seq}=\text{mod}(\lfloor I\_u/N_{PHICH}^{group}\rfloor+n\_u, 2N_{SF}^{PHICH})$.

mod( ) is a mod function; $\lfloor\ \rfloor$ is a floor function; $N_{PHICH}^{group}$ is a quantity of PHICH groups, and a value of $I_{PHICH}$ is 0 or 1; $N_{SF}^{PHICH}$ is a PHICH spreading factor, and a value is 2 or 4; and n_u and I_u are adjustment parameters, and values are zero or positive integers.

In this case, optionally, the sending unit 402 is further configured to send n_u and I_u to the user equipment.

Optionally, in a third application scenario, the resource management unit 401 is specifically configured to determine a number $n\_u_{PHICH}^{group}$ of a PHICH group of a first PHICH resource, and a number $n\_u_{PHICH}^{seq}$ of an orthogonal sequence in the PHICH group $n\_u_{PHICH}^{group}$, where in this case, a number of a PHICH group of an $M^{th}$ PHICH resource is $n\_u_{PHICH}^{group}+\Delta_M^{group}$, and a number of an orthogonal sequence in an $M^{th}$ PHICH group $n\_u_{PHICH}^{group}+\Delta_M^{group}$ is $n\_u_{PHICH}^{seq}+\Delta_M^{seq}$; M is a positive integer greater than 1; and $\Delta_M^{group}$ and $\Delta_M^{seq}$ are adjustment parameters, and values are integers.

According to the network device provided in this embodiment of the present invention, one or more PHICH resources of a first subframe are determined, where the one or more physical hybrid automatic repeat request indicator channel PHICH resources indicate a quantity of orthogonal frequency division multiplexing OFDM symbols included in a second subframe on an unlicensed carrier, and the network device sends the first subframe and the second subframe to user equipment. In this way, a quantity of physical resources included in the second subframe is indicated by using the PHICH resources of the first subframe. This resolves a prior-art problem that a receive end cannot determine a quantity of OFDMs included in an incomplete subframe, and cannot correctly receive the incomplete subframe.

Based on the foregoing embodiment corresponding to FIG. 3, an embodiment of the present invention provides user equipment, which is configured to execute the information transmission method described in the foregoing embodiment corresponding to FIG. 3.

Figure 5:
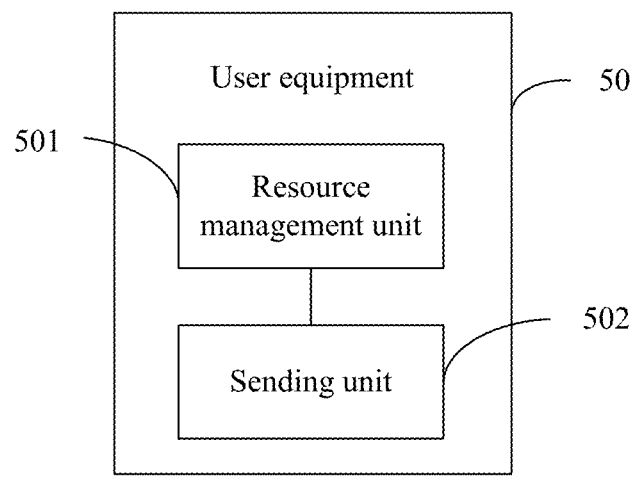
FIG. 5 is a schematic structural diagram of user equipment according to an embodiment of the present invention.

Referring to FIG. 5, the user equipment 50 includes a resource management unit 501 and a receiving unit 502.

The receiving unit 502 is configured to receive a first subframe that is sent by a network device.

The resource management unit 501 is configured to determine one or more physical hybrid automatic repeat request indicator channel PHICH resources of the first subframe, where the one or more physical hybrid automatic repeat request indicator channel PHICH resources indicate a quantity of orthogonal frequency division multiplexing OFDM symbols included in a second subframe on an unlicensed carrier.

The receiving unit 502 is further configured to receive, according to the quantity of the OFDM symbols included in the second subframe, the second subframe that is sent by the network device, where the first subframe includes M orthogonal frequency division multiplexing OFDM symbols, the second subframe includes N OFDM symbols, M and N are positive integers, and M≥N. Optionally, the first subframe may carry a first signal, where the first signal is used to indicate that the second subframe is an incomplete subframe.

Optionally, the resource management unit 501 is specifically configured to determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$.

Alternatively, optionally, the receiving unit 502 is further configured to receive a number $n\_u_{PHICH}^{group}$ of a PHICH group of the one or more PHICH resources, and a number $n\_u_{PHICH}^{group}$ of an orthogonal sequence in the PHICH group $n\_u_{PHICH}^{seq}$ that are sent by the network device.

Optionally, the resource management unit 501 is specifically configured to determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to a cell identity.

Three application scenarios are listed in this embodiment to describe in detail determining of a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$. Certainly, the application scenarios are merely examples used for description herein, and it does not indicate that the present invention is limited thereto.

Optionally, in a first application scenario, the resource management unit 501 is specifically configured to: determine a number $n\_u_{PHICH}^{group}$ of a PHICH group of the one or more PHICH resources according to a formula $n\_u_{PHICH}^{group}=\text{mod}(Cell\_ID, N_{PHICH}^{group})$, $n\_u_{PHICH}^{group}=\text{mod}(F(Cell\_ID), N_{PHICH}^{group})$, or $n\_u_{PHICH}^{group}=\text{mod}(F(Cell\_ID, Operator\_ID), N_{PHICH}^{group})$; or determine a number $n\_u_{PHICH}^{seq}$ of an orthogonal sequence in the PHICH group $n\_u_{PHICH}^{group}$ of the one or more PHICH resources according to a formula $n\_u_{PHICH}^{seq}=\text{mod}(Cell\_ID, N_{PHICH}^{seq})$, $n\_u_{PHICH}^{seq}=\text{mod}(F(Cell\_ID)N_{PHICH}^{seq})$, or $n\_u_{PHICH}^{seq}=\text{mod}(F(Cell\_ID, Operator\_ID), N_{PHICH}^{seq})$.

mod is a mod function, Cell_ID is a cell identity, F(Cell_ID) is a function in which the cell identity is an independent variable, Operator_ID is an operator identifier, F(Cell_ID,Operator_ID) is a function in which the cell identity and the operator identifier are independent variables, $N_{PHICH}^{group}$ is a quantity of PHICH groups, and $N_{PHICH}^{seq}$ is a quantity of orthogonal sequences in each PHICH group.

Optionally, in a second application scenario, the resource management unit 501 is specifically configured to determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to formulas $n\_u_{PHICH}^{group}=\mathrm{mod}(I\_u+n\_u, N_{PHICH}^{group})+I_{PHICH}N_{PHICH}^{group}$ and $n\_u_{PHICH}^{seq}=\mathrm{mod}(\lfloor I\_u/N_{PHICH}^{group}\rfloor+n\_u, 2N_{SF}^{PHICH})$.

mod( ) is a mod function; ⌊ ⌋ is a floor function; $N_{PHICH}^{group}$ is a quantity of PHICH groups, and a value of $I_{PHICH}$ is 0 or 1; $N_{SF}^{PHICH}$ is a PHICH spreading factor, and a value is 2 or 5; and n_u and I_u are adjustment parameters, and values are zero or positive integers.

In this case, optionally, the receiving unit 502 is further configured to receive n_u and I_u that are sent by the network device.

Optionally, in a third application scenario, the resource management unit 501 is specifically configured to determine a number $n\_u_{PHICH}^{group}$ of a PHICH group of a first PHICH resource, and a number $n\_u_{PHICH}^{seq}$ of an orthogonal sequence in the PHICH group $n\_u_{PHICH}^{group}$, where in this case, a number of a PHICH group of an $M^{th}$ PHICH resource is $n\_u_{PHICH}^{group}+\Delta_M^{group}$, and a number of an orthogonal sequence in an $M^{th}$ PHICH group $n\_u_{PHICH}^{group}+\Delta_M^{group}$ is $n\_u_{PHICH}^{seq}+\Delta_M^{seq}$; M is a positive integer greater than 1; and $\Delta_M^{group}$ and $\Delta_M^{seq}$ are adjustment parameters, and values are integers.

According to the user equipment provided in this embodiment of the present invention, a first subframe that is sent by a network device is received, one or more PHICH resources of the first subframe are determined, where the one or more PHICH resources indicate a quantity of OFDM symbols included in a second subframe on an unlicensed carrier, and the user equipment receives, according to the quantity of the OFDM symbols included in the second subframe, the second subframe that is sent by the network device. In this way, a quantity of physical resources included in the second subframe is indicated by using the PHICH resources of the first subframe. This resolves a prior-art problem that a receive end cannot determine a quantity of OFDM symbols included in an incomplete subframe, and cannot correctly receive the incomplete subframe.

Figure 6:
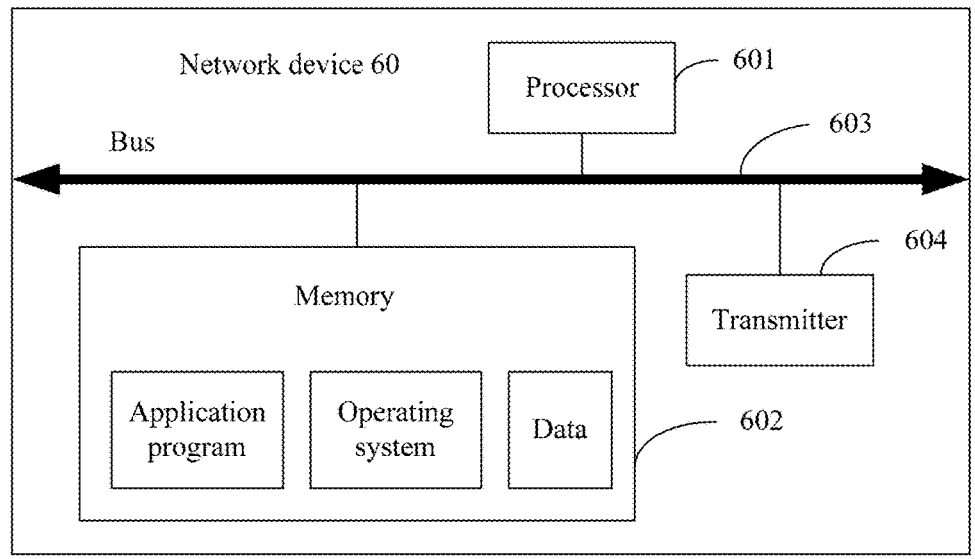
FIG. 6 is a schematic structural diagram of a network device according to another embodiment of the present invention.

Based on the foregoing embodiment corresponding to FIG. 2, another embodiment of the present invention provides a network device, which is configured to execute the information transmission method described in the foregoing embodiment corresponding to FIG. 2. Referring to FIG. 6, the network device 60 includes: at least one processor 601, a memory 602, a bus 603, and a transmitter 604, where the at least one processor 601, the memory 602, and the transmitter 604 are connected and complete mutual communication by using the bus 603.

The bus 603 may be an ISA (Industry Standard Architecture, industry standard architecture) bus, a PCI (Peripheral Component, peripheral component interconnect) bus, an EISA (Extended Industry Standard Architecture, extended industry standard architecture) bus, or the like. The bus 603 may be classified into an address bus, a data bus, a control bus, and the like. For convenience of indication, the bus is merely represented by using one thick line in FIG. 6. However, it does not indicate that there is only one bus or only one type of bus.

The memory 602 is configured to store application program code used to execute the solutions of the present invention. The application program code used to execute the solutions of the present invention is stored in the memory, and execution of the application program code is controlled by the processor 601.

The memory may be a read-only memory ROM or another type of static storage device that may store static information and instructions, or a random access memory RAM or another type of dynamic storage device that may store information and instructions; or may be an electrically erasable programmable read-only memory EEPROM, a compact disc read-only memory CD-ROM, or another compact disk storage, optical disc storage (including a compact disc, a laser disc, an optical disc, a digital versatile disc, a Blu-ray disc, and the like), a disk storage medium or another disk storage device, or any another medium that can be used to carry or store expected program code in a command or data structure form and can be accessed by a computer. However, the memory is not limited thereto. These memories are connected to the processor by using the bus.

The processor 601 may be a central processing unit 601 (Central Processing Unit, CPU for short), or an application specific integrated circuit (Application Specific Integrated Circuit, ASIC for short), or one or more integrated circuits configured to implement this embodiment of the present invention.

The processor 601 is configured to call program code in the memory 602. In a possible implementation, when the foregoing application program is executed by the processor 601, the following functions are implemented.

The processor 601 is configured to determine one or more physical hybrid automatic repeat request indicator channel PHICH resources of a first subframe, where the one or more physical hybrid automatic repeat request indicator channel PHICH resources indicate a quantity of orthogonal frequency division multiplexing OFDM symbols included in a second subframe on an unlicensed carrier.

The transmitter 604 is configured to send the first subframe and the second subframe to user equipment, where the second subframe is sent before the first subframe, the first subframe includes M orthogonal frequency division multiplexing OFDM symbols, the second subframe includes N OFDM symbols, M and N are positive integers, and M≥N. Optionally, the first subframe may carry a first signal, where the first signal is used to indicate that the second subframe is an incomplete subframe.

Optionally, the processor 601 is specifically configured to determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$.

Further, optionally, the transmitter 604 is further grow configured to send the number $n\_u_{PHICH}^{group}$ of the PHICH group of the one or more PHICH resources, and the number $n\_u_{PHICH}^{seq}$ of the orthogonal sequence in the PHICH group $n\_u_{PHICH}^{group}$ to the user equipment.

Optionally, the processor 601 is specifically configured to determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to a cell identity.

Three application scenarios are listed in this embodiment to describe in detail determining of a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$. Certainly, the application scenarios are merely examples used for description herein, and it does not indicate that the present invention is limited thereto.

Optionally, in a first application scenario, the processor 601 is specifically configured to: determine a number $n\_u_{PHICH}^{group}$ of a PHICH group of the one or more PHICH resources according to a formula $n\_u_{PHICH}^{group}=$ mod(Cell_ID,$N_{PHICH}^{group}$), n_$u_{PHICH}^{group}$=mod(F(Cell_ID),$N_{PHICH}^{group}$), or n_$u_{PHICH}^{group}$=mod(F(Cell_ID,Operator_ID),$N_{PHICH}^{group}$); or determine a number n_$u_{PHICH}^{seq}$ of an orthogonal sequence in the PHICH group n_$u_{PHICH}^{group}$ of the one or more PHICH resources according to a formula n_$u_{PHICH}^{seq}$=mod(Cell_ID,$N_{PHICH}^{seq}$), n_$u_{PHICH}^{seq}$=mod(F(Cell_ID),$N_{PHICH}^{seq}$), or n_$u_{PHICH}^{seq}$=mod(F(Cell_ID,Operator_ID),$N_{PHICH}^{seq}$).

mod( ) is a mod function, Cell_ID is a cell identity, F(Cell_ID) is a function in which the cell identity is an independent variable, Operator_ID is an operator identifier, F(Cell_ID,Operator_ID) is a function in which the cell identity and the operator identifier are independent variables, $N_{PHICH}^{group}$ is a quantity of PHICH groups, and $N_{PHICH}^{seq}$ is a quantity of orthogonal sequences in each PHICH group.

Optionally, in a second application scenario, the processor 601 is specifically configured to determine a number n_$u_{PHICH}^{group}$ of a PHICH group of the one or more PHICH resources, and a number n_$u_{PHICH}^{seq}$ of an orthogonal sequence in the PHICH group n_$u_{PHICH}^{group}$ according to formulas n_$u_{PHICH}^{group}$=mod(I_u+n_u,$N_{PHICH}^{group}$)+$I_{PHICH}N_{PHICH}^{group}$ and n_$u_{PHICH}^{seq}$=mod($\lfloor$I_u/$N_{PHICH}^{group}\rfloor$+n_u,$2N_{SF}^{PHICH}$).

mod( ) is a mod function; $\lfloor \; \rfloor$ is a floor function; $N_{PHICH}^{group}$ is a quantity of PHICH groups, and a value of $I_{PHICH}$ is 0 or 1; $N_{SF}^{PHICH}$ is a PHICH spreading factor, and a value is 2 or 4; and n_u and I_u are adjustment parameters, and values are zero or positive integers.

In this case, optionally, the transmitter 604 is further configured to send n_u and I_u to the user equipment.

Optionally, in a third application scenario, the processor 601 is specifically configured to determine a number n_$u_{PHICH}^{group}$ of a PHICH group of a first PHICH resource, and a number n_$u_{PHICH}^{seq}$ of an orthogonal sequence in the PHICH group n_$u_{PHICH}^{group}$, where in this case, a number of a PHICH group of an $M^{th}$ PHICH resource is n_$u_{PHICH}^{group}+\Delta_M^{group}$, and a number of an orthogonal sequence in an $M^{th}$ PHICH group n_$u_{PHICH}^{group}+\Delta_M^{group}$ H is n_$u_{PHICH}^{seq}+\Delta_M^{seq}$; M is a positive integer greater than 1; and $\Delta_M^{group}$ and $\Delta_M^{seq}$ are adjustment parameters, and values are integers.

According to the network device provided in this embodiment of the present invention, one or more PHICH resources of a first subframe are determined, where the one or more physical hybrid automatic repeat request indicator channel PHICH resources indicate a quantity of orthogonal frequency division multiplexing OFDM symbols included in a second subframe on an unlicensed carrier, and the network device sends the first subframe and the second subframe to user equipment. In this way, a quantity of physical resources included in the second subframe is indicated by using the PHICH resources of the first subframe. This resolves a prior-art problem that a receive end cannot determine a quantity of OFDMs included in an incomplete subframe, and cannot correctly receive the incomplete subframe.

Based on the foregoing embodiment corresponding to FIG. 3, another embodiment of the present invention provides user equipment, which is configured to execute the information transmission method described in the foregoing embodiment corresponding to FIG. 3.

Figure 7:
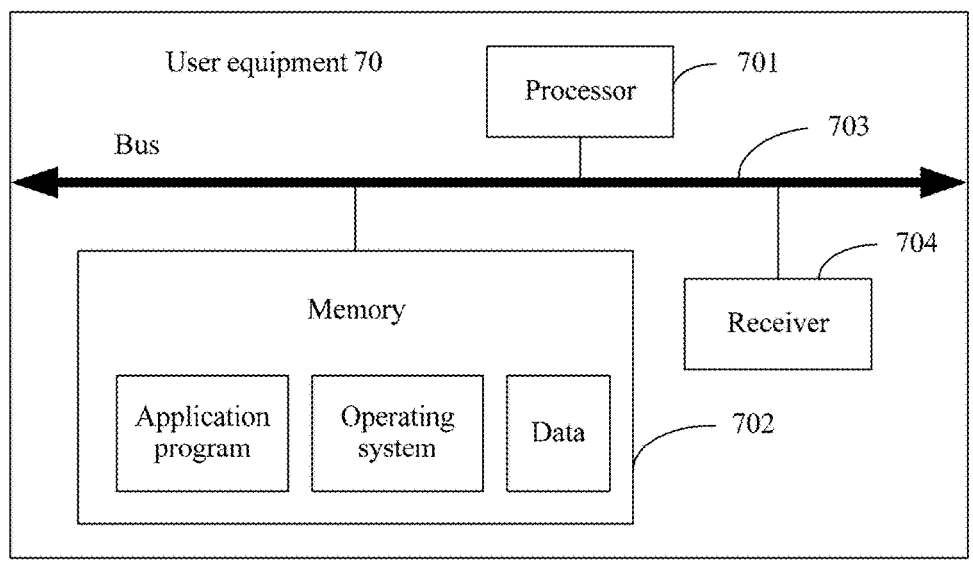
FIG. 7 is a schematic structural diagram of user equipment according to another embodiment of the present invention.

Referring to FIG. 7, the user equipment 70 includes: at least one processor 701, a memory 702, a bus 703, and a receiver 704, where the at least one processor 701, the memory 702, and the receiver 704 are connected and complete mutual communication by using the bus 703.

The bus 703 may be an ISA (Industry Standard Architecture, industry standard architecture) bus, a PCI (Peripheral Component, peripheral component interconnect) bus, an EISA (Extended Industry Standard Architecture, extended industry standard architecture) bus, or the like. The bus 703 may be classified into an address bus, a data bus, a control bus, and the like. For convenience of indication, the bus is merely represented by using one thick line in FIG. 7. However, it does not indicate that there is only one bus or only one type of bus.

The memory 702 is configured to store application program code used to execute the solutions of the present invention. The application program code used to execute the solutions of the present invention is stored in the memory, and execution of the application program code is controlled by the processor 701.

The memory may be a read-only memory ROM or another type of static storage device that may store static information and instructions, or a random access memory RAM or another type of dynamic storage device that may store information and instructions; or may be an electrically erasable programmable read-only memory EEPROM, a compact disc read-only memory CD-ROM, or another compact disk storage, optical disc storage (including a compact disc, a laser disc, an optical disc, a digital versatile disc, a Blu-ray disc, and the like), a disk storage medium or another disk storage device, or any another medium that can be used to carry or store expected program code in a command or data structure form and can be accessed by a computer. However, the memory is not limited thereto. These memories are connected to the processor by using the bus.

The processor 701 may be a central processing unit 701 (Central Processing Unit, CPU for short), or an application specific integrated circuit (Application Specific Integrated Circuit, ASIC for short), or one or more integrated circuits configured to implement this embodiment of the present invention.

The processor 701 is configured to call program code in the memory 702. In a possible implementation, when the foregoing application program is executed by the processor 701, the following functions are implemented.

The receiver 704 is configured to receive a first subframe that is sent by a network device.

The processor 701 is configured to determine one or more physical hybrid automatic repeat request indicator channel PHICH resources of the first subframe, where the one or more physical hybrid automatic repeat request indicator channel PHICH resources indicate a quantity of orthogonal frequency division multiplexing OFDM symbols included in a second subframe on an unlicensed carrier.

The receiver 704 is further configured to receive, according to the quantity of the OFDM symbols included in the second subframe, the second subframe that is sent by the network device, where the first subframe includes M orthogonal frequency division multiplexing OFDM symbols, the second subframe includes N OFDM symbols, M and N are positive integers, and M≥N. Optionally, the first subframe may carry a first signal, where the first signal is used to indicate that the second subframe is an incomplete subframe.

Optionally, the processor 701 is specifically configured to determine a number n_$u_{PHICH}^{group}$ of a PHICH group of the one or more PHICH resources, and a number n_$u_{PHICH}^{seq}$ of an orthogonal sequence in the PHICH group n_$u_{PHICH}^{group}$.

Alternatively, optionally, the receiver 704 is further configured to receive a number n_$u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ that are sent by the network device.

Optionally, the processor 701 is specifically configured to determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to a cell identity.

Three application scenarios are listed in this embodiment to describe in detail determining of a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$. Certainly, the application scenarios are merely examples used for description herein, and it does not indicate that the present invention is limited thereto.

Optionally, in a first application scenario, the processor 701 is specifically configured to: determine a number $n\_u_{PHICH}^{group}$ of a PHICH group of the one or more PHICH resources according to a formula $n\_u_{PHICH}^{group}=\mod(\text{Cell\_ID}, N_{PHICH}^{group})$, $n\_u_{PHICH}^{group}=\mod(F(\text{Cell\_ID}), N_{PHICH}^{group})$, or $n\_u_{PHICH}^{group}=\mod(F(\text{Cell\_ID}, \text{Operator\_ID}) N_{PHICH}^{group})$; or determine a number $n\_u_{PHICH}^{seq}$ of an orthogonal sequence in the PHICH group $n\_u_{PHICH}^{group}$ of the one or more PHICH resources according to a formula $n\_u_{PHICH}^{seq}=\mod(\text{Cell\_ID}, N_{PHICH}^{seq})$, $n\_u_{PHICH}^{seq}=\mod(F(\text{Cell\_ID}), N_{PHICH}^{seq})$, or $n\_u_{PHICH}^{seq}=\mod(F(\text{Cell\_ID}, \text{Operator\_ID}), N_{PHICH}^{seq})$.

mod( ) is a mod function, Cell_ID is a cell identity, F(Cell_ID) is a function in which the cell identity is an independent variable, Operator_ID is an operator identifier, F(Cell_ID,Operator_ID) is a function in which the cell identity and the operator identifier are independent variables, $N_{PHICH}^{group}$ is a quantity of PHICH groups, and $N_{PHICH}^{seq}$ is a quantity of orthogonal sequences in each PHICH group.

Optionally, in a second application scenario, the processor 701 is specifically configured to determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to formulas $n\_u_{PHICH}^{group}=\mod(I\_u+n\_u, N_{PHICH}^{group})+I_{PHICH} N_{PHICH}^{group}$ and $n\_u_{PHICH}^{seq}=\mod(\lfloor I\_u/N_{PHICH}^{group} \rfloor+n\_u, 2N_{SF}^{PHICH})$.

mod( ) is a mod function; $\lfloor \ \rfloor$ is a floor function; $N_{PHICH}^{group}$ is a quantity of PHICH groups, and a value of $I_{PHICH}$ is 0 or 1; $N_{SF}^{PHICH}$ is a PHICH spreading factor, and a value is 2 or 5; and n_u and I_u are adjustment parameters, and values are zero or positive integers.

In this case, optionally, the receiver 704 is further configured to receive n_u and I_u that are sent by the network device.

Optionally, in a third application scenario, the processor 701 is specifically configured to determine a number $n\_u_{PHICH}^{group}$ of a PHICH group of a first PHICH resource, and a number $n\_u_{PHICH}^{group}$ of an orthogonal sequence in the PHICH group $n\_u_{PHICH}^{seq}$, where in this case, a number of a PHICH group of an $M^{th}$ PHICH resource is $n\_u_{PHICH}^{group}+\Delta_M^{group}$, and a number of an orthogonal sequence in an $M^{th}$ PHICH group $n\_u_{PHICH}^{group}+\Delta_M^{group}$ is $n\_u_{PHICH}^{seq}+\Delta_M^{seq}$; M is a positive integer greater than 1; and $\Delta_M^{group}$ and $\Delta_M^{seq}$ are adjustment parameters, and values are integers.

According to the user equipment provided in this embodiment of the present invention, a first subframe that is sent by a network device is received, one or more PHICH resources of the first subframe are determined, where the one or more PHICH resources indicate a quantity of OFDM symbols included in a second subframe on an unlicensed carrier, and the user equipment receives, according to the quantity of the OFDM symbols included in the second subframe, the second subframe that is sent by the network device. In this way, a quantity of physical resources included in the second subframe is indicated by using the PHICH resources of the first subframe. This resolves a prior-art problem that a receive end cannot determine a quantity of OFDM symbols included in an incomplete subframe, and cannot correctly receive the incomplete subframe.

Figure 8:
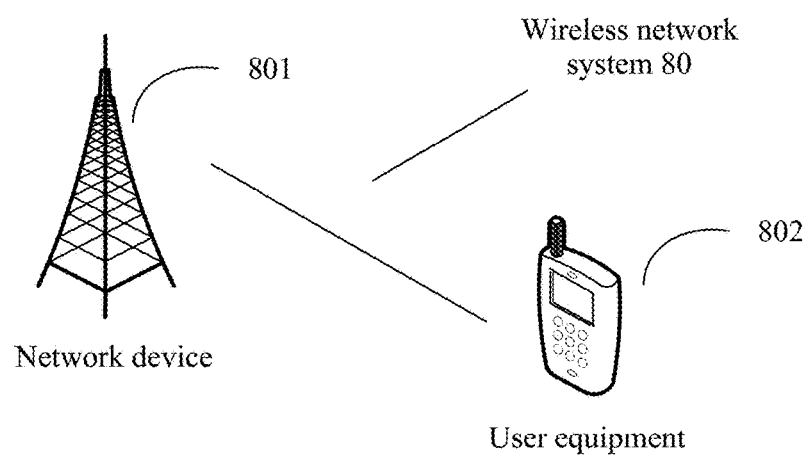
FIG. 8 is a schematic structural diagram of a wireless network system according to an embodiment of the present invention.

Based on the foregoing embodiments corresponding to FIG. 2 and FIG. 3, an embodiment of the present invention provides a wireless network system, which is configured to execute the information transmission methods described in the foregoing embodiments corresponding to FIG. 2 and FIG. 3. Referring to FIG. 8, the wireless network system 80 includes a network device 801 and user equipment 802.

The network device 801 is the network device described in the embodiment corresponding to FIG. 4, and the user equipment 802 is the user equipment described in the embodiment corresponding to FIG. 5.

Alternatively, the network device 801 is the network device described in the embodiment corresponding to FIG. 6, and the user equipment 802 is the user equipment described in the embodiment corresponding to FIG. 7.

According to the wireless network system provided in this embodiment of the present invention, a network device determines one or more PHICH resources of a first subframe, where the one or more physical hybrid automatic repeat request indicator channel PHICH resources indicate a quantity of orthogonal frequency division multiplexing OFDM symbols included in a second subframe on an unlicensed carrier; and the network device sends the first subframe and the second subframe to user equipment. In this way, a quantity of physical resources included in the second subframe is indicated by using the PHICH resources of the first subframe. This resolves a prior-art problem that a receive end cannot determine a quantity of OFDMs included in an incomplete subframe, and cannot correctly receive the incomplete subframe.

In addition, a computer readable medium (or a medium) is further provided, including a computer readable instruction that is used to perform the following operation when being executed: performing the operations of step 201 and step 202, or step 301 to step 303 in the methods in the foregoing embodiments.

In addition, a computer program product is further provided, including the foregoing computer readable medium.

It should be noted that signaling mentioned in this specification includes but is not limited to: an indication, information, a signal, a message, or the like. This is not limited herein.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, function units in the embodiments of the present invention may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is taken as an example but is not limited: The computer readable medium may include a RAM (Random Access Memory, random access memory), a ROM (Read-Only Memory, read-only memory), an EEPROM (Electrically Erasable Programmable Read-Only Memory, electrically erasable programmable read-only memory), a CD-ROM (Compact Disc Read-Only Memory, compact disc read-only memory) or other optical disk storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a DSL (Digital Subscriber Line, digital subscriber line), or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and a disc used by the present invention includes a CD (Compact Disc, compact disc), a laser disc, an optical disc, a DVD disc (Digital Versatile Disc, digital versatile disc), a floppy disk and a Blu-ray disc, where the disk generally copies data by a magnetic means, and the disc copies data optically by a laser means. The foregoing combination should also be included in the protection scope of the computer-readable medium.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An information transmission method, comprising:
determining, by a network device, one or more physical hybrid automatic repeat request indicator channel (PHICH) resources of a first subframe, wherein the PHICH resources indicate a quantity of orthogonal frequency division multiplexing (OFDM) symbols comprised in a second subframe on an unlicensed carrier, including determining, by the network device, a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to a cell identity; and
sending, by the network device, the first subframe and the second subframe to user equipment, wherein the second subframe is sent before the first subframe, the first subframe comprises M OFDM symbols, the second subframe comprises N OFDM symbols, M and N are positive integers, and M≥N.

2. An information transmission method, comprising:
determining, by a network device, one or more physical hybrid automatic repeat request indicator channel (PHICH) resources of a first subframe, wherein the PHICH resources indicate a quantity of orthogonal frequency division multiplexing (OFDM) symbols comprised in a second subframe on an unlicensed carrier, including:
determining, by the network device, a number $n\_u_{PHICH}^{group}$ of a PHICH group of the one or more PHICH resources according to a formula $n\_u_{PHICH}^{group}=\mathrm{mod}(\mathrm{Cell\_ID}, N_{PHICH}^{group})$, $n\_u_{PHICH}^{group}=\mathrm{mod}(F(\mathrm{Cell\_ID}), N_{PHICH}^{group})$, or $n\_u_{PHICH}^{group}=\mathrm{mod}(F(\mathrm{Cell\_ID}, \mathrm{Operator\_ID}), N_{PHICH}^{group})$; and
determining, by the network device, a number $n\_u_{PHICH}^{seq}$ of an orthogonal sequence in the PHICH group $n\_u_{PHICH}^{group}$ of the one or more PHICH resources according to a formula $n\_u_{PHICH}^{seq}=\mathrm{mod}(\mathrm{Cell\_ID}, N_{PHICH}^{seq})$, $n\_u_{PHICH}^{seq}=\mathrm{mod}(F(\mathrm{Cell\_ID}), N_{PHICH}^{seq})$, or $n\_u_{PHICH}^{seq}=\mathrm{mod}(F(\mathrm{Cell\_ID}, \mathrm{Operator\_ID}), N_{PHICH}^{seq})$, wherein
mod( ) is a mod function, Cell_ID is a cell identity, F(Cell_ID) is a function in which the cell identity is an independent variable, Operator_ID is an operator identifier, F(Cell_ID,Operator_ID) is a function in which the cell identity and the operator identifier are independent variables, $N_{PHICH}^{group}$ is a quantity of PHICH groups, and $N_{PHICH}^{seq}$ is a quantity of orthogonal sequences in each PHICH group; and
sending, by the network device, the first subframe and the second subframe to user equipment, wherein the second subframe is sent before the first subframe, the first subframe comprises M OFDM symbols, the second subframe comprises N OFDM symbols, M and N are positive integers, and M≥N.

3. An information transmission method, comprising:
determining, by a network device, one or more physical hybrid automatic repeat request indicator channel (PHICH) resources of a first subframe, wherein the PHICH resources indicate a quantity of orthogonal frequency division multiplexing (OFDM) symbols comprised in a second subframe on an unlicensed carrier, including
determining, by the network device, a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to formulas $n\_u_{PHICH}^{group}=\mathrm{mod}(\lfloor \mathrm{I\_u}+n\_u, N_{PHICH}^{group})+I_{PHICH} N_{PHICH}^{group}$ and $n\_u_{PHICH}^{seq}=\mathrm{mod}(\lfloor \mathrm{I\_u}/N_{PHICH}^{group} \rfloor+n\_u, 2 N_{SF}^{PHICH})$, wherein mod( ) is a mod function; $\lfloor\ \rfloor$ is a floor function; $N_{PHICH}^{group}$ is a quantity of PHICH groups, and a value of $I_{PHICH}$ is 0 or 1; $N_{SF}^{PHICH}$ is a PHICH spreading factor, and a value is 2 or 4; and n_u and I_u are adjustment parameters, and values are zero or positive integers; and
sending, by the network device, the first subframe and the second subframe to user equipment, wherein the second subframe is sent before the first subframe, the first subframe comprises M OFDM symbols, the second subframe comprises N OFDM symbols, M and N are positive integers, and M≥N.

4. An information transmission method, comprising:
receiving, by user equipment, a first subframe sent by a network device;
determining, by the user equipment, one or more physical hybrid automatic repeat request indicator channel (PHICH) resources of the first subframe, wherein the PHICH resources indicate a quantity of orthogonal frequency division multiplexing (OFDM) symbols comprised in a second subframe on an unlicensed carrier, including determining, by the user equipment, a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to a cell identity; and
receiving, by the user equipment according to the quantity of the OFDM symbols comprised in the second subframe, the second subframe that is sent by the network device, wherein the first subframe comprises M OFDM symbols, the second subframe comprises N OFDM symbols, M and N are positive integers, and M≥N.

5. An information transmission method, comprising:
receiving, by user equipment, a first subframe sent by a network device;
determining, by a network device, one or more physical hybrid automatic repeat request indicator channel (PHICH) resources of a first subframe, wherein the PHICH resources indicate a quantity of orthogonal frequency division multiplexing (OFDM) symbols comprised in a second subframe on an unlicensed carrier, including:
determining, by the network device, a number $n\_u_{PHICH}^{group}$ of a PHICH group of the one or more PHICH resources according to a formula $n\_u_{PHICH}^{group}=\mathrm{mod}(\mathrm{Cell\_ID}, N_{PHICH}^{group})$, $n\_u_{PHICH}^{group}=\mathrm{mod}(F(\mathrm{Cell\_ID}), N_{PHICH}^{group})$, or $n\_u_{PHICH}^{group}=\mathrm{mod}(F(\mathrm{Cell\_ID}, \mathrm{Operator\_ID}), N_{PHICH}^{group})$; and
determining, by the network device, a number $n\_u_{PHICH}^{seq}$ of an orthogonal sequence in the PHICH group $n\_u_{PHICH}^{group}$ of the one or more PHICH resources according to a formula $n\_u_{PHICH}^{seq}=\mathrm{mod}(\mathrm{Cell\_ID}, N_{PHICH}^{seq})$, $n\_u_{PHICH}^{seq}=\mathrm{mod}(F(\mathrm{Cell\_ID}), N_{PHICH}^{group})$, or $n\_u_{PHICH}^{seq}=\mathrm{mod}(F(\mathrm{Cell\_ID}, \mathrm{Operator\_ID}), N_{PHICH}^{seq})$, wherein
mod( ) is a mod function, Cell_ID is a cell identity, F(Cell_ID) is a function in which the cell identity is an independent variable, Operator_ID is an operator identifier, F(Cell_ID,Operator_ID) is a function in which the cell identity and the operator identifier are independent variables, $N_{PHICH}^{group}$ is a quantity of PHICH groups, and $N_{PHICH}^{seq}$ is a quantity of orthogonal sequences in each PHICH group; and
receiving, by the user equipment according to the quantity of the OFDM symbols comprised in the second subframe, the second subframe that is sent by the network device, wherein the first subframe comprises M OFDM symbols, the second subframe comprises N OFDM symbols, M and N are positive integers, and M≥N.

6. An information transmission method, comprising:
receiving, by user equipment, a first subframe sent by a network device;
determining, by the user equipment, one or more physical hybrid automatic repeat request indicator channel (PHICH) resources of the first subframe, wherein the PHICH resources indicate a quantity of orthogonal frequency division multiplexing (OFDM) symbols comprised in a second subframe on an unlicensed carrier, including determining, by the user equipment, a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to formulas $n\_u_{PHICH}^{group}=\mathrm{mod}(\mathrm{I\_u}+n\_u, N_{PHICH}^{group})+I_{PHICH} N_{PHICH}^{group}$ and $n\_u_{PHICH}^{seq}=\mathrm{mod}(\lfloor \mathrm{I\_u}/$ $N_{PHICH}^{group}$⌋+n_u,2$N_{SF}^{PHICH}$), wherein mod( ) is a mod function; ⌊ ⌋ s a floor function; $N_{PHICH}^{group}$ is a quantity of PHICH groups, and a value of $I_{PHICH}$ is 0 or 1; $N_{SF}^{PHICH}$ is a PHICH spreading factor, and a value is 2 or 4; and n_u and I_u are adjustment parameters, and values are zero or positive integers; and receiving, by the user equipment according to the quantity of the OFDM symbols comprised in the second subframe, the second subframe that is sent by the network device, wherein the first subframe comprises M OFDM symbols, the second subframe comprises N OFDM symbols, M and N are positive integers, and M≥N.

7. A network device, comprising:
a processor, a memory, a bus, and a transmitter, wherein the processor, the memory, and the transmitter are connected to each other by using the bus;
the processor is configured to:
  determine one or more physical hybrid automatic repeat request indicator channel (PHICH) resources of a first subframe, wherein the PHICH resources indicate a quantity of orthogonal frequency division multiplexing (OFDM) symbols comprised in a second subframe on an unlicensed carrier, and
  determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to a cell identity; and
the transmitter is configured to send the first subframe and the second subframe to user equipment, wherein the second subframe is sent before the first subframe, the first subframe comprises M OFDM symbols, the second subframe comprises N OFDM symbols, M and N are positive integers, and M≥N.

8. A network device, comprising:
a processor, a memory, a bus, and a transmitter, wherein the processor, the memory, and the transmitter are connected to each other by using the bus;
the processor is configured to:
  determine one or more physical hybrid automatic repeat request indicator channel (PHICH) resources of a first subframe, wherein the PHICH resources indicate a quantity of orthogonal frequency division multiplexing (OFDM) symbols comprised in a second subframe on an unlicensed carrier,
  determine a number $n\_u_{PHICH}^{group}$ of a PHICH group of the one or more PHICH resources according to a formula $n\_u_{PHICH}^{group}$=mod(Cell_ID,$N_{PHICH}^{group}$), $n\_u_{PHICH}^{group}$=mod(F(Cell_ID),$N_{PHICH}^{group}$), or $n\_u_{PHICH}^{group}$=mod(F(Cell_ID,Operator_ID), $N_{PHICH}^{group}$), and
  determine a number $n\_u_{PHICH}^{seq}$ of an orthogonal sequence in the PHICH group $n\_u_{PHICH}^{group}$ of the one or more PHICH resources according to a formula $n\_u_{PHICH}^{seq}$=mod(Cell_ID,$N_{PHICH}^{seq}$), $n\_u_{PHICH}^{seq}$=mod(F(Cell_ID),$N_{PHICH}^{group}$), or $n\_u_{PHICH}^{seq}$=mod(F(Cell_ID,Operator_ID), $N_{PHICH}^{seq}$), wherein
  mod( ) is a mod function, Cell_ID is a cell identity, F(Cell_ID) is a function in which the cell identity is an independent variable, Operator_ID is an operator identifier, F(Cell_ID,Operator_ID) is a function in which the cell identity and the operator identifier are independent variables, $N_{PHICH}^{group}$ is a quantity of PHICH groups, and $N_{PHICH}^{seq}$ is a quantity of orthogonal sequences in each PHICH group; and the transmitter is configured to send the first subframe and the second subframe to user equipment, wherein the second subframe is sent before the first subframe, the first subframe comprises M OFDM symbols, the second subframe comprises N OFDM symbols, M and N are positive integers, and M≥N.

9. A network device, comprising;
a processor, a memory, a bus, and a transmitter, wherein the processor, the memory, and the transmitter are connected to each other by using the bus;
the processor is configured to:
  determine one or more physical hybrid automatic repeat request indicator channel (PHICH) resources of a first subframe, wherein the PHICH resources indicate a quantity of orthogonal frequency division multiplexing (OFDM) symbols comprised in a second subframe on an unlicensed carrier, and
  determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to formulas $n\_u_{PHICH}^{group}$=mod(I_u+n_u,$N_{PHICH}^{group}$)+$I_{PHICH}$$N_{PHICH}^{group}$ and $n\_u_{PHICH}^{seq}$=mod(⌊I_u/$N_{PHICH}^{group}$⌋+n_u,2$N_{SF}^{PHICH}$), wherein
  mod( ) is a mod function; ⌊ ⌋ is a floor function; $N_{PHICH}^{group}$ is a quantity of PHICH groups, and a value of $I_{PHICH}$ is 0 or 1; $N_{SF}^{PHICH}$ a PHICH spreading factor, and a value is 2 or 4; and n_u and I_u are adjustment parameters, and values are zero or positive integers; and
the transmitter is configured to send the first subframe and the second subframe to user equipment, wherein the second subframe is sent before the first subframe, the first subframe comprises M OFDM symbols, the second subframe comprises N OFDM symbols, M and N are positive integers, and M≥N.

10. The device according to claim 9, wherein:
the transmitter is further configured to send n_u and I_u to the user equipment.

11. A network device, comprising:
a processor, a memory, a bus, and a transmitter, wherein the processor, the memory, and the transmitter are connected to each other by using the bus;
the processor is configured to:
  determine one or more physical hybrid automatic repeat request indicator channel (PHICH) resources of a first subframe, wherein the PHICH resources indicate a quantity of orthogonal frequency division multiplexing (OFDM) symbols comprised in a second subframe on an unlicensed carrier,
  determine a number $n\_u_{PHICH}^{group}$ of a PHICH group of a first PHICH resource, and a number $n\_u_{PHICH}^{seq}$ of an orthogonal sequence in the PHICH group $n\_u_{PHICH}^{group}$, wherein a number of a PHICH group of an $M^{th}$ PHICH resource is $n\_u_{PHICH}^{group}$+$\Delta_M^{group}$, and a number of an orthogonal sequence in an $M^{th}$ PHICH group $n\_u_{PHICH}^{group}$+$\Delta_M^{group}$ is $n\_u_{PHICH}^{seq}$+$\Delta_M^{seq}$; M is a positive integer greater than 1; and $\Delta_M^{group}$ and $\Delta_M^{seq}$ are adjustment parameters, and values are integers; and
the transmitter is configured to send the first subframe and the second subframe to user equipment, wherein the second subframe is sent before the first subframe, the first subframe comprises M OFDM symbols, the second subframe comprises N OFDM symbols, N is a positive integer, and M≥N.

12. User equipment, comprising:
a processor, a memory, a bus, and a receiver, wherein the processor, the memory, and the receiver are connected to each other by using the bus;
the receiver is configured to receive a first subframe sent by a network device;
the processor is configured to:
determine one or more physical hybrid automatic repeat request indicator channel (PHICH) resources of the first subframe, wherein the PHICH resources indicate a quantity of orthogonal frequency division multiplexing (OFDM) symbols comprised in a second subframe on an unlicensed carrier, and
determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to a cell identity; and
the receiver is further configured to receive, according to the quantity of the OFDM symbols comprised in the second subframe, the second subframe that is sent by the network device, wherein the first subframe comprises M OFDM symbols, the second subframe comprises N OFDM symbols, M and N are positive integers, and M≥N.

13. User equipment, comprising:
a processor, a memory, a bus, and a receiver, wherein the processor, the memory, and the receiver are connected to each other by using the bus;
the receiver is configured to receive a first subframe sent by a network device;
the processor is configured to:
determine one or more physical hybrid automatic repeat request indicator channel (PHICH) resources of the first subframe, wherein the PHICH resources indicate a quantity of orthogonal frequency division multiplexing (OFDM) symbols comprised in a second subframe on an unlicensed carrier, and
determine a number $n\_u_{PHICH}^{group}$ of a PHICH group of the one or more PHICH resources according to a formula $n\_u_{PHICH}^{group}=\text{mod}(\text{Cell\_ID},N_{PHICH}^{group})$, $n\_u_{PHICH}^{group}=\text{mod}(F(\text{Cell\_ID}),N_{PHICH}^{group})$, or $n\_u_{PHICH}^{group}=\text{mod}(F(\text{Cell\_ID},\text{Operator\_ID}),N_{PHICH}^{group})$, and
determine a number $n\_u_{PHICH}^{seq}$ of an orthogonal sequence in the PHICH group $n\_u_{PHICH}^{group}$ of the one or more PHICH resources according to a formula $n\_u_{PHICH}^{seq}=\text{mod}(\text{Cell\_ID},N_{PHICH}^{seq})$, $n\_u_{PHICH}^{seq}=\text{mod}(F(\text{Cell\_ID}),N_{PHICH}^{seq})$, or $n\_u_{PHICH}^{seq}=\text{mod}(F(\text{Cell\_ID},\text{Operator\_ID}),N_{PHICH}^{seq})$, wherein
mod( ) is a mod function, Cell_ID is a cell identity, F(Cell_ID) is a function in which the cell identity is an independent variable, Operator_ID is an operator identifier, F(Cell_ID, Operator_ID) is a function in which the cell identity and the operator identifier are independent variables, $N_{PHICH}^{group}$ is a quantity of PHICH groups, and $N_{PHICH}^{seq}$ is a quantity of orthogonal sequences in each PHICH group; and
the receiver is further configured to receive, according to the quantity of the OFDM symbols comprised in the second subframe, the second subframe that is sent by the network device, wherein the first subframe comprises M OFDM symbols, the second subframe comprises N OFDM symbols, M and N are positive integers, and M≥N.

14. User equipment, comprising:
a processor, a memory, a bus, and a receiver, wherein the processor, the memory, and the receiver are connected to each other by using the bus;
the receiver is configured to receive a first subframe sent by a network device;
the processor is configured to:
determine one or more physical hybrid automatic repeat request indicator channel (PHICH) resources of the first subframe, wherein the PHICH resources indicate a quantity of orthogonal frequency division multiplexing (OFDM) symbols comprised in a second subframe on an unlicensed carrier, and
determine a number $n\_u_{PHICH}^{group}$ of a PHICH group of the one or more PHICH resources, and a number $n\_u_{PHICH}^{seq}$ of an orthogonal sequence in the PHICH group $n\_u_{PHICH}^{group}$ according to formulas $n\_u_{PHICH}^{group}=\text{mod}(I\_u+n\_u,N_{PHICH}^{group})+I_{PHICH} \cdot N_{PHICH}^{group}$ and $n\_u_{PHICH}^{seq}=\text{mod}(\lfloor I\_u/N_{PHICH}^{group}\rfloor+n\_u,2N_{SF}^{PHICH})$, wherein is a mod function; $\lfloor\ \rfloor$ is a floor function; $N_{PHICH}^{group}$ is a quantity of PHICH groups, and a value of $I_{PHICH}$ is 0 or 1; $N_{SF}^{PHICH}$ is a PHICH spreading factor, and a value is 2 or 4; and n_u and I_u are adjustment parameters, and values are zero or positive integers; and
the receiver is further configured to receive, according to the quantity of the OFDM symbols comprised in the second subframe, the second subframe that is sent by the network device, wherein the first subframe comprises M OFDM symbols, the second subframe comprises N OFDM symbols, M and N are positive integers, and M≥N.

15. The device according to claim 14, wherein:
the receiver is further configured to receive n_u and I_u that are sent by the network device.

16. User equipment, comprising:
a processor, a memory, a bus, and a receiver, wherein the processor, the memory, and the receiver are connected to each other by using the bus;
the receiver is configured to receive a first subframe sent by a network device;
the processor is configured to:
determine one or more physical hybrid automatic repeat request indicator channel (PHICH) resources of the first subframe, wherein the PHICH resources indicate a quantity of orthogonal frequency division multiplexing (OFDM) symbols comprised in a second subframe on an unlicensed carrier, and
determine a number $n\_u_{PHICH}^{group}$ a PHICH group of a first PHICH resource, and a number $n\_u_{PHICH}^{seq}$ of an orthogonal sequence in the PHICH group $n\_u_{PHICH}^{group}$, wherein a number of a PHICH group of an $M^{th}$ PHICH resource is $n\_u_{PHICH}^{group}+\Delta_M^{group}$, and a number of an orthogonal sequence in an $M^{th}$ PHICH group $n\_u_{PHICH}^{group}+\Delta_M^{group}$ is $n\_u_{PHICH}^{seq}+\Delta_M^{seq}$; M is a positive integer greater than 1; and $\Delta_M^{group}$ and $\Delta_M^{seq}$ are adjustment parameters, and values are integers; and
the receiver is further configured to receive, according to the quantity of the OFDM symbols comprised in the second subframe, the second subframe that is sent by the network device, wherein the first subframe comprises M OFDM symbols, the second subframe comprises N OFDM symbols, N is a positive integer, and M≥N.

* * * * *